United States Patent
Gopalakrishnan et al.

(10) Patent No.: US 12,413,076 B2
(45) Date of Patent: Sep. 9, 2025

(54) SYSTEMS AND METHODS FOR MICROGRID-POWER DISTRIBUTION MANAGEMENT WHEN DISTRIBUTED ENERGY RESOURCES TRANSITION BETWEEN OPERATING MODES

(71) Applicant: BLOOM ENERGY CORPORATION, San Jose, CA (US)

(72) Inventors: Vishal Anand Aisur Gopalakrishnan, San Jose, CA (US); Ranganathan Gurunathan, San Jose, CA (US); Prasad Pmsvvsv, San Jose, CA (US); Rangesh Babu Chennakesavula, San Jose, CA (US); Borra Mohan Krishna, San Jose, CA (US); Rajkannu Govindan, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/755,295

(22) Filed: Jun. 26, 2024

(65) Prior Publication Data
US 2025/0007293 A1    Jan. 2, 2025

(30) Foreign Application Priority Data
Jun. 27, 2023    (IN) .............. 202341043106

(51) Int. Cl.
*H02J 3/38*    (2006.01)
*H02J 3/28*    (2006.01)

(52) U.S. Cl.
CPC ............... *H02J 3/388* (2020.01); *H02J 3/28* (2013.01); *H02J 3/381* (2013.01); *H02J 2300/30* (2020.01)

(58) Field of Classification Search
CPC ............. H02J 2300/30; H02J 3/28–322; H02J 3/38–50; H02J 1/10–12; H02J 1/14
See application file for complete search history.

(56) References Cited

U.S. PATENT DOCUMENTS 10,596,919 B2    3/2020    Srinivasan et al.
10,873,099 B1 *  12/2020    Gurunathan ...... H01M 8/04604
(Continued)

OTHER PUBLICATIONS

Chae et al., Cooperative operation method of two battery systems at Microgrid system, 3rd IEEE International Symposium on Power Electronics for Distributed Generation Systems (PEDG) 2012, Date of Conference: Jun. 25-28, 2012, pp. 872-877.
(Continued)

*Primary Examiner* — Rexford N Barnie
*Assistant Examiner* — David A Shiao
(74) *Attorney, Agent, or Firm* — Evergreen Valley Law Group; Kanika Radhakrishnan

(57) ABSTRACT

Systems and methods for microgrid-power distribution management when distributed energy resources transition between operating modes. The system includes a fuel cell system that generates DC power and a multi-mode inverter system that operates in one of the operating modes based on an availability status of grid, a site controller that receives electrical signal(s) facilitates the multi-mode inverter system to transition between the operating modes, generates a control signal based at least on an load operating input and transitioning of the multi-mode inverter system, a DC braking module that turns ON in response to receipt of the control signal, dissipates excess energy from the DC bus when the DC voltage value is greater than a threshold voltage value and energy storage module that turns ON in response to receipt of the control signal, supplies power to the DC bus, when the DC voltage value is less than the load operating input.

18 Claims, 11 Drawing Sheets

(56) References Cited

U.S. PATENT DOCUMENTS

| | | | |
|---|---|---|---|
| 10,998,833 B2 | 5/2021 | Ilic et al. | |
| 11,527,964 B2 | 12/2022 | Naiknaware et al. | |
| 11,990,790 B2 | 5/2024 | Pmsvvsv et al. | |
| 2002/0060556 A1* | 5/2002 | Wall | H02J 3/38 |
| | | | 322/29 |
| 2011/0004357 A1* | 1/2011 | Mathiowetz | H02J 3/381 |
| | | | 700/295 |
| 2011/0222320 A1* | 9/2011 | Delmerico | H02J 3/32 |
| | | | 363/37 |
| 2019/0052083 A1* | 2/2019 | Lucas, Jr. | H02J 3/46 |
| 2020/0169088 A1* | 5/2020 | Myers | H02J 7/34 |
| 2022/0094160 A1* | 3/2022 | Zdrazil | H02J 7/0068 |
| 2022/0311354 A1* | 9/2022 | Gerçek | H02J 3/381 |
| 2023/0205146 A1* | 6/2023 | Williams | H02J 7/0047 |
| | | | 700/287 |
| 2023/0261517 A1* | 8/2023 | Pulikanti | H02J 3/32 |
| | | | 307/43 |
| 2023/0383729 A1* | 11/2023 | Shenoy | H02J 3/381 |

OTHER PUBLICATIONS

Khederzadeh et al., Frequency control of microgrids in autonomous mode by a novel control scheme based on droop characteristics, Electric Power Components and Systems, Electric Power Components and Systems, Dec. 10, 2012, pp. 16-30.

Goyal et al., Overload prevention in an autonomous microgrid using battery storage units, 2014 IEEE PES General Meeting | Conference & Exposition, Date of Conference: Jul. 27-31, 2014, 05 pages, IEEE.

Shi et al., A method for microgrid connected fuel cell inverters seamless transitions between voltage source and current source modes, 9th International Conference on Power Electronics-ECCE Asia, Date of Conference: Jun. 1-5, 2015, pp. 2718-2723.

\* cited by examiner

SYSTEMS AND METHODS FOR MICROGRID-POWER DISTRIBUTION MANAGEMENT WHEN DISTRIBUTED ENERGY RESOURCES TRANSITION BETWEEN OPERATING MODES

TECHNICAL FIELD

The present invention relates to the field of power systems and, more particularly, to systems and methods for managing power distribution in a microgrid site when distributed energy resources transition between operating modes such as a grid-following mode and a grid-forming mode.

BACKGROUND

With the ever-increasing demand for energy consumption, Distributed Generation (DG) is continuing to play a crucial role in balancing the realm of energy supply and demand. DG technologies take advantage of Distributed Energy Resources (DERs). DERs may be micro-turbines, solar photovoltaic systems, fuel cells stack, wind energy systems, etc. Further, interconnection and interoperability of DERs with an electrical grid need to abide by certain standards set by the Institute of Electrical and Electronics Engineers (IEEE) Standards Association. Such standards ensure reliable and safe transmission grid facilities and facilitate their operations. Control and management strategies for appropriate supply and distribution of power to the grid and a load through a microgrid that is using such DERs are needed.

With an ever-increasing incidence of blackouts in distribution systems connected to the grid caused by a range of natural and man-made calamities, frequent and essential isolation and reconnection of loads also increases. It is noted that due to the isolation and reconnection of the loads to the grid, the power conversion systems connected to the DERs transition between operating modes. These operating modes may be the grid-following mode (also termed as 'grid parallel mode') and the grid-forming mode (also termed as 'island volt mode'). The grid-following mode involves some level of power export or import from the grid based on the loads connected, whereas, in grid-forming mode, the generated power only comes from the DERs and always follows the load, as the grid is disconnected from the load.

Furthermore, the DERs and their associated power conversion systems are connected to the grid via grid isolation devices (also termed as 'Intentional Island Interconnection Devices') which basically are circuit breakers whose operation is controlled by a combination of a switch and a controller. Examples of grid isolation devices may include a Multi-mode Switch Board (MMSB) and an Automatic Transfer Switch Board (ATSB).

FIG. 1A provides an example of a prior art environment 100 indicating operation and power flow in a microgrid site operating in a grid-following mode. FIG. 1B provides an example of a prior art environment 100 indicating operation and power flow in a microgrid site operating in a grid-forming mode. The prior art environment 100 includes the grid 102, at least one load, e.g., a critical load 104 and a non-critical load 106, and a DER such as a fuel cell system 108. The connection of the at least one load 104 or 106 to the fuel cell system 108 forms the microgrid site. The prior art environment 100 also includes an ATSB 110 used as the grid isolation switch. The ATSB 110 includes an industry-standard Automatic Transfer Switch (ATS) 112, an electrically operated Wrap Around Circuit Breaker (WACB) 114, and one or more supporting auxiliary circuits (not shown in FIG. 1A).

Further, the ATS 112 is shown in FIG. 1A and FIG. 1B is a three-position ATS and is typically used in three positions, namely, a "position N" denoting Normal, a "position E" denoting Emergency, and an intermediate position (not shown) between the "position N" and the "position E". The ATS 112 also includes a "terminal L" which is connected to the critical load 104. The terminal 'L' is provided with a connector 116 that switches between the three positions as shown in FIG. 1A and FIG. 1B.

Further, Input/Output (I/O) signals 118 are exchanged between the ATSB 110 and a controller (not shown in FIG. 1A and FIG. 1B) associated with the fuel cell system 108. The I/O signals 118 assists the controller to determine the operating mode of the microgrid site or the power conversion system being one of the grid-following mode and the grid-forming mode.

In the grid-following mode, the connector 116 connects the at least one load to the grid 102 as the connector 116 gets positioned at the "position N". When the connector 116 is positioned at the "position N", the fuel cell system 108 powers the at least one load such as the critical load 104 by operating as a current source through the WACB 114 as shown by a power flow signal 120 in FIG. 1A. If a load operating power requirement of the critical load 104 is less than a power supplying capacity of the fuel cell system 108, then excess power is fed back to the grid 102 through the "position N" in the ATS 112, as shown by a power flow signal 122 in FIG. 1A.

During grid outage, the WACB 114 is opened and the ATS 112 transfers the connector 116 from the "position N" to the "position E" as shown in FIG. 1B, and the fuel cell system 108 begins to power the critical load 104 as a voltage source. This is because, during a power outage, there is a transition from the grid-following mode to the grid-forming mode. Further, the flow of power in the grid-forming mode is shown by a power flow signal 124 in FIG. 1B. Further, when the grid 102 is available again, there is a transition from the grid-forming mode to the grid-following mode, upon switching the position of the connector 116 from the "position E" to the "position N" by the ATS 112.

To that note, it may be observed that it takes a finite non-zero transfer time during these transitions since the ATS 112 has to switch the position of the connector 116 between the "position N" and the "position E". During these transitions, the power output from the fuel cell system 108 shall drop to zero which is explained with the help of FIG. 2.

FIG. 2 is a timing diagram 200 showing a sequence of events during the transition between the grid-following mode and the grid-forming mode in the prior art environment 100 of FIGS. 1A and 1B. The I/O signals 118 include a WACB Auxiliary (WACB Aux or WACB AUX) signal, a Grid Good (GRID GOOD) signal, and a WACB System Command (WACB SC) signal. The WACB Aux signal refers to a signal that indicates a status of the WACB 114 such as the WACB 114 being 'ON' or 'OFF', or 'closed' or 'open'. The WACB Aux signal is transmitted from the WACB 114 of the ATSB 110 to the controller, for the controller of the fuel cell system 108 to know the status of the WACB 114. The Grid Good signal refers to a signal that indicates whether the grid 102 is good and working or not. The Grid Good signal is transmitted from the ATS 112 of the ATSB 110 to the controller, for the controller to know whenever the grid 102 goes bad. Further, the WACB SC signal refers to a signal that corresponds to a system command transmitted from the controller to the WACB 114 commanding the WACB 114 to open or close based on the availability of the grid 102.

It may be observed from FIG. 2 that, the status of the I/O signals 118 such as the WACB Aux signal, the Grid Good signal, and the WACB SC signal collectively indicate whether the operating mode of the power conversion system of the fuel cell system 108 is transitioning from the grid-following mode to the grid-forming mode (see 202) or from the grid-forming mode to the grid-following mode (see 204). Therefore, when transitioning from the grid-following mode to the grid-forming mode, i.e., when the grid 102 goes bad, the I/O signals 118 transitions from "High" to "Low". FIG. 2 shows finite time instances from "$t_1$" to "$t_5$" which correspond to a sequence of events happening as the grid voltage (Grid V or GRID V) drops and the power conversion system of the fuel cell system 108 transitions from being a current source (in the grid-following mode) to being a voltage source (in the grid-forming mode).

Some of the sequence of events includes transitioning the I/O signals 118 from "High" to "Low". The events also include transitioning signals such as Emergency voltage (Emer V or EMER V), a load voltage (Load V or LOAD V), and a DER power (DER POWER) as illustrated in FIG. 2. Those signals correspond to Emergency voltage supplied to the critical load 104, the load voltage at a terminal of the at least one load, and Direct Current (DC) power generated by the fuel cell system 108 respectively. Moreover, the total time for the transition from the grid-following mode to the grid-forming mode, corresponds to $t_{GP\_to\_IV}$ which is given as "$t_{GP\_to\_IV}=t_1+t_2+t_3+t_4+t_5$".

Subsequently, when the grid 102 is restored, the operating mode may transition from the grid-forming mode to the grid-following mode (see 204). As soon as the grid voltage returns, the ATS112 automatically switches the connector 116 from the "position E" to the "position N". The I/O signals 118 and other signals (Load V and DER power) shall changeover from "Low" to "High" (see 204). The total time for transitioning from the grid-forming mode to the grid-following mode, corresponds to $t_{IV\_to\_GP}$ which is given as "$t_{IV\_to\_GP}=t_6+t_7+t_8+t_9$". For instance, a typical value of $t_{GP\_to\_IV}$ for many of the micro-grid sites shall be between 1 to 15 seconds. The typical value of $t_{IV\_to\_GP}$ shall be in the range of 300 seconds where the majority of time is dominated by the grid reconnect time, $t_9$.

Thus, in such prior art systems, it may be noted that, during these transitions (both grid-following mode to grid-forming mode (see 202) and from grid-forming mode to grid-following mode (see 204)), the power from the fuel cell system 108 (i.e., the DER power) changes from "Full load" to "No load" (see 206) and hence the fuel cell system 108 is turned off instantly which is undesirable. These transients have a direct impact on the long-term life and reliability of power modules such as fuel cell systems. Also, any change in the power output of the fuel cell system 108 results in certain momentary temperature changes inside the fuel cell system 108, for example, a Solid Oxide Fuel Cell (SOFC). This further results in the degradation of the SOFC as temperature changes have some reliability impact. Further, when transitioning from the grid-following mode to grid-forming mode (see 202), as the fuel cell system 108 is instantly turned OFF, during the Black start period, the fuel cell system 108 is unable to supply power with its full capacity to the load, as it is ramping up during this process (see 208). For example, the fuel cell system 108 may be limited to 100 kilowatts (kW) even though the supply capacity of the fuel cell system 108 is 300 kW.

Further, in most of these kinds of sites, the operating requirements of the loads connected on the output bus are typically less than the grid supply capacity, yet, in most cases, more than the supply capacity of the DERs. In such cases, one approach is to manage load when transferring from the grid parallel mode to an island volt mode. Load management may be carried out by segregating loads such that loads less than the supply capacity of the DERs, are connected on a separate feeder and additional loads that can be shed during grid events shall be on the grid 102. Moreover, power management of the fuel cell system 108 is also essential to match the load requirements.

Hence, there exists a need for systems and methods for regulating the change in the power output of the DERs such as the fuel cell systems while switching between the operating modes (grid-following mode and the grid-forming mode).

SUMMARY

Various embodiments of the present disclosure provide systems and methods for managing power distribution in a microgrid site when distributed energy resources transition between at least two operating modes.

In an embodiment, a system is disclosed that includes a fuel cell system and a multi-mode inverter system electrically connected to the fuel cell system via a Direct Current (DC) bus. The system further includes a site controller electronically coupled to a plurality of electrical points and a plurality of electrical components in a microgrid site. Further, the system includes a DC braking module and an energy storage module electrically connected to the DC bus. The fuel cell system is configured to generate DC power in the microgrid site. The multi-mode inverter system is configured to operate in one of the at least two operating modes based at least on an availability status of a grid electrically coupled to the microgrid site, for supplying power to at least one load. The at least two operating modes includes a grid-following mode and a grid-forming mode. The site controller is configured to receive at least one of a plurality of electrical signals from the plurality of electrical points and the plurality of electrical components, and a load operating input corresponding to the at least one load connected to the microgrid site. The site controller is further configured to facilitate the multi-mode inverter system to transition between the at least two operating modes based at least on the plurality of electrical signals. Further, the site controller is configured to generate a control signal based at least on the load operating input and the transitioning of the multi-mode inverter system between the at least two operating modes. The DC braking module is configured to turn ON in response to the receipt of the control signal generated by the site controller. The DC braking module is configured to receive a DC voltage value from the DC bus. The DC braking module is further configured to dissipate excess energy, via energy dissipating circuitry, from the DC bus when the DC voltage value is greater than a threshold voltage value. The energy storage module is configured to turn ON in response to the receipt of the control signal. The energy storage module is configured to supply power to the DC bus for supporting the at least one load, when the DC voltage value in the DC bus is less than the load operating input.

In another embodiment, a method is disclosed that includes receiving at least one of a plurality of electrical signals from a plurality of electrical points and a plurality of electrical components, and a load operating input corresponding to at least one load connected to a microgrid site. The method further includes facilitating a multi-mode inverter system to transition between at least two operating modes based at least on the plurality of electrical signals. The at least two operating modes include a grid-following mode and a grid-forming mode. Further, the method includes generating a control signal based at least on the load operating input and the transitioning of the multi-mode inverter system between the at least two operating modes. Furthermore, the method includes transmitting the control signal to one of a DC braking module and an energy storage module based at least on the load operating input and the transitioning of the multi-mode inverter system between the at least two operating modes, the control signal indicating one of activation and deactivation of one of the DC braking module and the energy storage module for regulating DC voltage on the DC bus.

BRIEF DESCRIPTION OF THE FIGURES

For a more complete understanding of example embodiments of the present technology, reference is now made to the following descriptions taken in connection with the accompanying drawings in which.

Figure 1A:
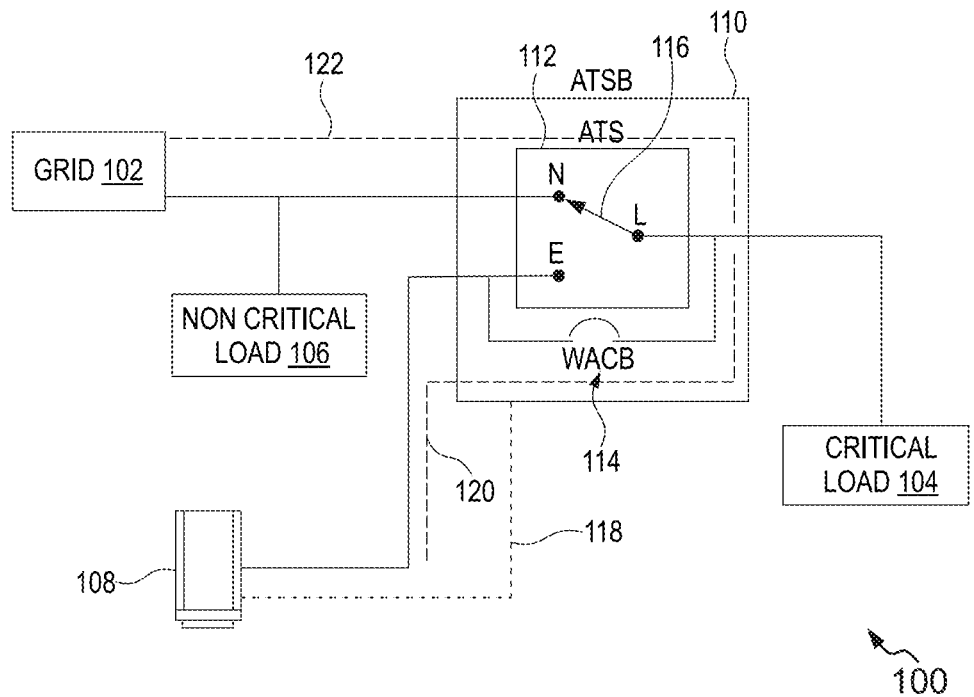
FIG. 1A provides an example of a prior art environment indicating operation and power flow in a microgrid site operating in a grid-following mode.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification does not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, those skilled in the art will appreciate that many variations and/or alterations to those specific details are within the scope of the present disclosure. Similarly, although many of the features of the present disclosure are described in terms of each other, or in conjunction with each other, those skilled in the art will appreciate that many of these features can be provided independently of other features. Accordingly, this description of the present disclosure is set forth without any loss of generality to, and without imposing limitations upon, the present disclosure.

The terms "grid", "public grid", "electrical grid", "main grid", "power grid", and "utility" are generally used interchangeably throughout the description, and they refer to an interconnected network of one or more components for electricity delivery from producers such as power stations to consumer loads.

The term "microgrid" refers to a local electrical grid with defined boundaries, acting as a single and controllable entity that is usually attached to a main grid but is also able to function independently.

The term "site controller" refers to a control unit configured to control one or more electrical devices, one or more electronic devices, one or more switches, one or more units, elements, or components, a plurality of electrical sensors, and/or a plurality of electronic sensors, based on one or more operating modes and one or more operating parameters of the microgrid site. The one or more operating modes may include a grid-following mode and a grid-forming mode. The one or more operating parameters may include current, voltage, power, frequency, etc.

The terms "grid-following mode" and "grid parallel mode" may be used interchangeably throughout the description, and they may refer to a mode of operation of an inverter in a power conversion system receiving power from a Distributed Energy Resource (DER) (e.g., a fuel cell), in which the inverter tracks a voltage angle of the grid or the microgrid via an inverter controller to control an output (synchronizing to the grid or the microgrid) of the inverter.

The terms "grid-forming mode", "grid isolation mode", "island volt mode", and "islanding mode" may be used interchangeably throughout the description, and they may refer to a mode of operation of an inverter in a power conversion system receiving power from a DER (e.g., a fuel cell), in which the inverter actively controls the frequency and voltage output of the inverter independent of the grid via the inverter controller.

The terms "power conversion system" and "multi-mode inverter system" may be used interchangeably throughout the description, and they refer to an electrical circuit that changes the electric energy from one form to another desired form optimized for a specific load. The change of the electrical energy may include Direct Current (DC) to DC or DC to Alternating Current (AC) depending upon a type of load connected to the microgrid. Further, the multi-mode inverter system may include an inverter and an inverter controller along with circuitry elements such as resistors, capacitors, inductors, etc., if needed.

The term "inverter" refers to an electronic device that changes Direct Current (DC) to Alternating Current (AC).

The term "inverter controller" refers to a controller that controls an operation of the inverter for regulating an output of the inverter to match certain conditions, by taking feedback from the output of the inverter or by taking input from the site controller.

The terms "fuel cell system" and "fuel cell" may be used interchangeably throughout the description, and they refer to an electrochemical cell that converts the chemical energy of a fuel (often hydrogen) and an oxidizing agent (often oxygen) into electricity through a pair of redox reactions. The fuel cell system may contain a stack of multiple fuel cells.

The terms "load", "electric load", and "consumer load" may be used interchangeably throughout the description, and they refer to any component of a circuit that consumes power or energy.

The terms "grid isolation device" and "grid isolation unit" may be used interchangeably throughout the description, and they refer to a switching device capable of closing, carrying, and breaking the current under normal and abnormal circuit conditions within a specified time while transitioning between the grid-forming mode and the grid-following mode.

The term "DC bus" refers to a common connection between two or more devices that operate in DC.

The terms "DC braking module", "DCBM", "DBM" and "braking module" may be used interchangeably throughout the description, and they refer to an electrical and electronic circuit used to regulate voltage on the DC bus.

The term "Black start" refers to the ability of generators to restart parts of the power system to recover from a blackout. This entails isolated power stations being started individually and gradually reconnected to one another to form an interconnected system again. More specifically, the Black start in a microgrid is followed by the islanding mode operation. The challenge during islanding mode operation is to manage the active and reactive power demand that results from the load behavior, and the active and reactive infeed that results from the DERs in the microgrid.

Overview

Various example embodiments of the present disclosure provide systems and methods for managing power distribution in a microgrid site when Distributed Energy Resources (DERs) transition between operating modes such as a grid-following mode and a grid-forming mode. Since the development of the concept of distributed generation, loads, such as critical loads and non-critical loads, receive a supply of power from the DERs in the presence of a grid that is connected to microgrids having the DERs or with the grid being disconnected from the microgrids upon the occurrence of any faults in the grid. The DERs may need Power Conversion Systems (PCSs) for controlling the supply of energy from the DERs in terms of a type of supply (DC or AC), a voltage level, etc., based on an availability of the grid and load operating requirements associated with the loads connected to the microgrids.

Generally, when DERs are supplying power in the presence of the grid, the PCSs may be operating in the grid-following mode, and in the absence of the grid, in the grid-forming mode. However, as mentioned above, typical problems arise when transitioning between the two operating modes. Thus, in order to address the above-mentioned problems, short-term energy, and power buffering may be needed either for a load management mechanism to start or for the DERs to graciously change output power transmitted to the loads from the DERs. The present disclosure proposes the systems and the methods for providing such short-term energy and power buffering to such microgrids. Examples of DERs include a solar photovoltaic system, a fuel cell system, a wind energy system, etc.

In a non-limiting example, the microgrid site is connected to the grid via a grid isolation device. The grid isolation device may be used in scenarios where the microgrid site may be islanded intentionally from the grid based on technical or economical conditions. Generally, the microgrid site includes the DER such as the fuel cell system associated with the power conversion system, and the site controller. In accordance with the present disclosure, the system provides a DC braking module to the microgrid site for providing short-term power buffering to the microgrid site.

Therefore, in other words, it may be noted that the system includes the fuel cell system that generates DC power in the microgrid site. The system further includes a multi-mode inverter system (can also be termed as the power conversion system) electrically connected to the fuel cell system via a DC bus. The multi-mode inverter system operates in one of at least two operating modes based at least on an availability status of the grid, for supplying power to at least one load. The at least two operating modes include the grid-following mode and the grid-forming mode.

Further, the system includes the site controller electronically coupled to a plurality of electrical points and a plurality of electrical components in the microgrid site. The site controller receives at least one of a plurality of electrical signals from the plurality of electrical points and the plurality of electrical components, and a load operating input corresponding to the at least one load connected to the microgrid site. The site controller facilitates the multi-mode inverter system to transition between the at least two operating modes based at least on the load operating input and the plurality of electrical signals. The load operating input may include a range of values corresponding to operating parameters associated with the at least one load. Further, the site controller generates a control signal during a startup of the system based at least on the load operating input and the transitioning of the multi-mode inverter system between the at least two operating modes.

The system also includes the DC braking module electrically connected to the DC bus. The DC braking module turns ON in response to the receipt of the control signal. The DC braking module receives a DC voltage value from the DC bus, upon turning ON. The DC braking module dissipates excess energy, via energy dissipating circuitry, from the DC bus when the DC voltage value is greater than a threshold voltage value. The system further includes an energy storage module electrically connected to the DC bus. The energy storage module turns ON in response to the receipt of the control signal. The energy storage module supplies power to the DC bus for supporting the at least one load, when the DC voltage value on the DC bus is less than the load operating input.

It may be understood that the control signal may be transmitted to one of the DC braking module and the energy storage module based at least on the transitioning of the load operating input and the multi-mode inverter system between the at least two operating modes. The control signal may be indicating one of activation (turn ON) and deactivation (turn OFF) of one of the DC braking module and the energy storage module for regulating DC voltage on the DC bus.

In an embodiment, the DC braking module may include a DC mid-bus capacitor sub-module, a DBM controller sub-module, and a DC chopper sub-module electrically connected with each other. Also, the energy dissipating circuitry may correspond to the DC chopper sub-module.

Various embodiments of the present disclosure offer multiple advantages and technical effects. For instance, the introduction of the DC braking module on the DC bus or the intermediate DC buses of the microgrid site provide benefits such as momentary buffering of the DERs when transitioning from the grid-following mode to the grid-forming mode. During this time, loads can be managed and decreased to the DERs' capacity, and then the switch to the grid-forming mode can be made smoothly without affecting the DERs' output power. Additionally, this offers the feature of enabling a full step load on the DERs during the Black start phase.

Further, during the transition from the grid-forming mode to the grid-following mode, the DC braking module enables a graceful turn OFF of the DERs instead of sudden shutdown which can cause thermal shock to the DERs. Furthermore, the rating on DC braking resistors ensures a pulsed operation of the DC braking module for shorter periods of time, thereby providing intermittent pulse energy dissipation capability to the DERs for reducing excess energy on the intermediate DC buses.

Therefore, the main technical advantage of the present invention is in the momentary support of the DERs to take up load equivalent to their rating if the amount of time for mode transitions is much smaller. Without the DC braking module, in order to achieve the same step load capability during mode transitions would require more energy buffer modules (energy storage modules). Also, the DC braking module plays a crucial role in absorbing energy in the microgrid sites when inverters from different manufacturers are powering a common load.

Figure 3A:
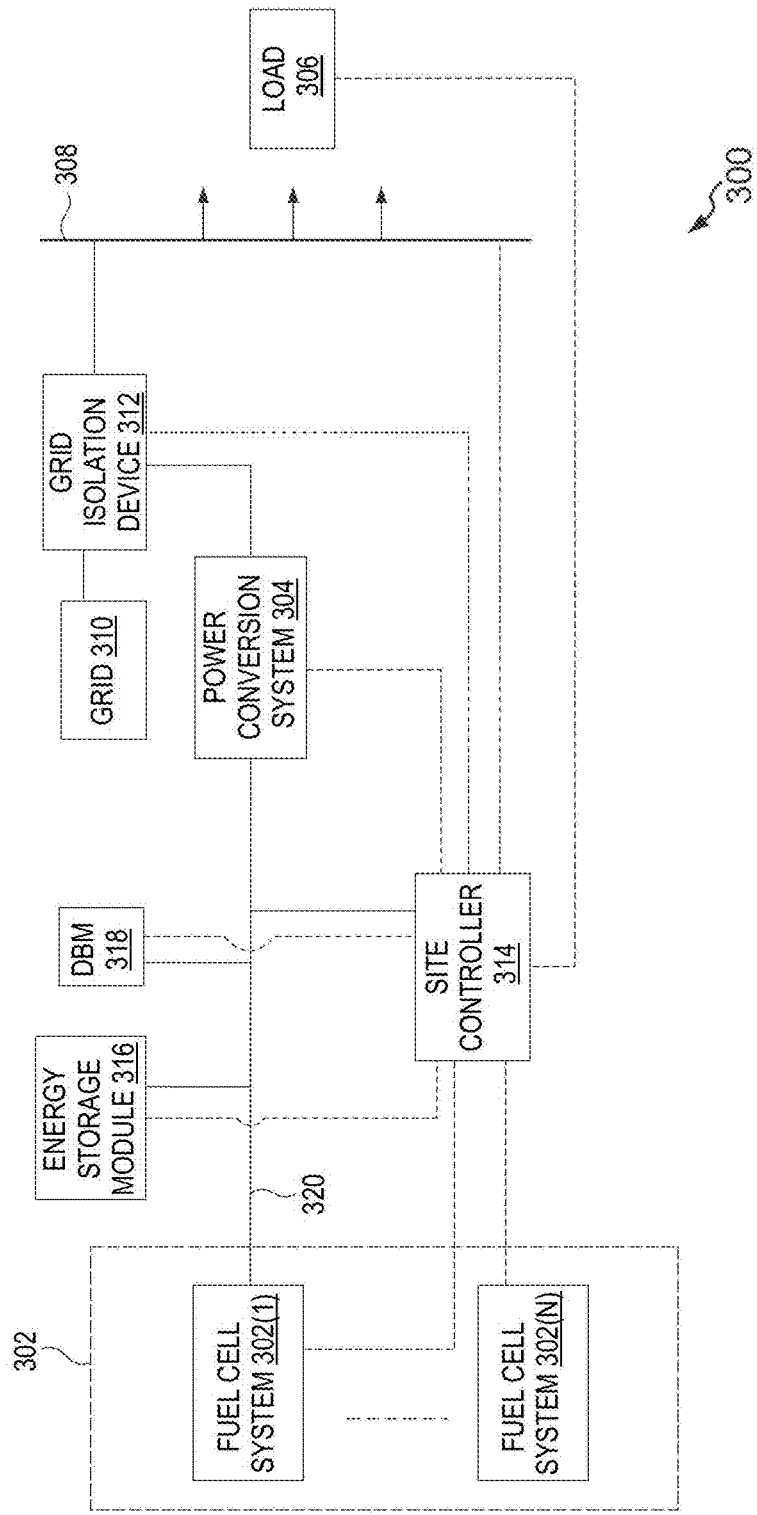
FIG. 3A illustrates an environment related to at least some examples of the present disclosure.

FIG. 3A illustrates an environment 300 related to at least some examples of the present disclosure. Although the environment 300 is presented in one arrangement, other embodiments may include the parts of the environment 300 (or other parts) arranged differently depending on, for example, a system for management of power distribution in a microgrid site when transitioning between at least two operating modes of distributed energy resources (DERs). The at least two operating modes may include a grid-following mode and a grid-forming mode. For instance, the DERs may include a solar photovoltaic system, a fuel cell system, a wind energy system, etc.

The environment 300 illustrated in FIG. 3A includes a plurality of fuel cell systems 302(1), 302(2), ... 302(N) ('N' is a natural number) (hereinafter, collectively referred to as 'fuel cell systems 302'). Each of the fuel cell systems 302 is configured to generate Direct Current (DC) electrical power. Examples of the fuel cell systems 302 include Solid Oxide Fuel Cell (SOFC) systems, Proton Exchange Membrane Fuel Cell (PEMFC) systems, Molten Carbonate Fuel Cell (MCFC) systems, and/or combinations of SOFC, PEMFC and MCFC systems, etc.

In one embodiment, the fuel cell systems 302 are connected to a central power conversion system (not shown). In another embodiment, each of the fuel cell systems 302(1)-302(N) may be connected to a respective power conversion system (e.g., a power conversion system 304 connected to the fuel cell system 302(1)). For the sake of brevity, in the environment 300 illustrated in FIG. 3A, only the fuel cell system 302(1) is connected to the power conversion system 304, and the rest are omitted.

The power conversion system 304 in the environment 300 may be the DC-AC power conversion system (hereinafter, interchangeably referred to as "multi-mode inverter system 304") that converts the DC electrical power generated by the fuel cell system 302(1) to Alternating Current (AC) electrical power. The AC electrical power is supplied to the load 306 via an AC bus 308.

In some embodiments, apart from the multi-mode inverter system 304, the microgrid site may be provided with one or more power conversion systems that are connected to a single fuel cell system (e.g., the fuel cell system 302(1)). The one or more power conversion systems may include a DC-DC power conversion system or a DC-AC power conversion system depending upon a load 306. For instance, if a DC load needs to receive power from the fuel cell system 302(1), the power that the DC load requires to operate may be more than the power supply capacity of the fuel cell system 302(1). In such scenarios, the one or more power conversion systems may include a DC-DC boost converter. Further, in some embodiments, along with the DC-DC boost converter, the microgrid site may also be provided with a DC-AC power conversion system for supplying power to AC loads and a grid 310.

The load 306 may be a critical load or a non-critical load. Any excess power generated may be transmitted to the grid 310. Therefore, the environment 300 also includes at least one load (e.g., the load 306), the AC bus 308, and the grid 310. For instance, the critical load may include data centers servers, life support systems at hospitals, and the like, which have a direct impact on the ability of an organization to operate and must either be kept running when the supply from the grid 310 fails or shut down gradually to avoid system failures, data corruption, life-shortening hardware damage, and the like. In order to keep acritical load running independently in absence of the supply of power from the grid 310, or to reduce dependency and power consumption from the grid 310, the critical load may be provided with power from the fuel cell system (e.g., the fuel cell system 302(1)). However, a non-critical load may not need power from the fuel cell systems 302 and may be connected only to the grid 310.

In some embodiments, in presence of the grid 310, the multi-mode inverter system 304 operates in the grid-following mode and operates as a current source for supplying the AC power to the load 306 and excess power to the grid 310. In absence of the grid 310, the multi-mode inverter system 304 operates in the grid-forming mode and operates as a voltage source for supplying the AC power to the load 306.

The environment 300 further includes a grid isolation device 312. The grid isolation device 312 may operate to connect or disconnect the grid 310 with the microgrid site based on detection of any faults in the grid 310. Examples of the grid isolation device 312 include a Multi-mode Switch Board (MMSB), an Automatic Transfer Switch Board (ATSB), etc. More specifically, the grid isolation device 312 operates to connect or disconnect the load 306 associated with the microgrid site. For instance, when the grid isolation device 312 connects the grid 310 to the load 306, then the multi-mode inverter system 304 supplies power to the load 306 by operating in the grid-following mode. Alternatively, when the grid isolation device 312 disconnects the grid 310 from the load 306, then the multi-mode inverter system 304 supplies power to the load 306 by operating in the grid-forming mode.

Additionally, the environment 300 depicts a site controller 314 electronically coupled to a plurality of electrical points and a plurality of electrical components in the microgrid site. The plurality of electrical components may include at least one of the fuel cell systems 302, the power conversion systems (e.g., the power conversion system 304), the grid isolation device 312, and the like. The plurality of electrical points may include one or more connection points on the AC bus 308. The plurality of electrical points may also include other connection points in the microgrid site 314 from where one or more electrical parameters may have to be measured by the site controller 314 (in order for the site controller 314 to take certain decisions associated with an operation of the plurality of electrical components of the microgrid site). For instance, the one or more electrical parameters may include current, voltage, power, frequency, etc.

The site controller 314 is configured to receive at least one of a plurality of electrical signals from the plurality of electrical points and the plurality of electrical components, and a load operating input corresponding to the at least one load (e.g., the load 306) connected to the microgrid site. For instance, the plurality of electrical signals may correspond to electrical values corresponding to the one or more electrical parameters. As used herein, the term "load operating input" refers to a range of values corresponding to an electrical parameter such as voltage, current, power, frequency, etc., that is required by the load for the proper functioning of the load. Therefore, the load operating input may include a range of values corresponding to operating parameters associated with the load 306.

The site controller 314 is further configured to facilitate the multi-mode inverter system 304 to transition between the at least two operating modes based at least on the plurality of electrical signals. The at least two operating modes may include the grid-following mode and the grid-forming mode. For instance, the site controller 314 may determine a status of the grid isolation device 312 based at least on the plurality of electrical signals. The status of the grid isolation device 312 may be one of 'connected to grid' and 'disconnected from grid'. Further, based on the status of the grid isolation device 312, the site controller 314 may transmit a control message to the multi-mode inverter system 304, the control message indicating the multi-mode inverter system 304 to operate in one of the at least two operating modes based upon the status of the grid isolation device 312. Further, the site controller 314 is configured to generate a control signal based at least on the load operating input and the transitioning of the multi-mode inverter system 304 between the at least two operating modes.

The environment 300 further depicts an energy storage module 316 and a DC Braking Module (DBM) 318 electrically connected to a DC bus 320 as shown in FIG. 3A. The energy storage module 316 is configured to turn ON in response to the receipt of the control signal. The energy storage module 318 is further configured to supply power to the DC bus 320 for supporting the at least one load 306, when a DC voltage value on the DC bus 320 is less than the load operating input. For instance, the energy storage module 316 includes a battery.

The DBM 318 is configured to turn ON in response to the receipt of the control signal. The DBM 318 is configured to receive the DC voltage value from the DC bus 320. The DBM 318 is further configured to dissipate the excess energy via energy dissipating circuitry (not shown in FIG. 3A) from the DC bus when the DC voltage value is greater than a threshold voltage value. The threshold voltage value may correspond to a maximum operating DC bus voltage value (specified in the drive settings) of the DC bus 320 beyond which a fault of DC bus overvoltage may be triggered. Thus, the excess energy in the DC bus may have to be discharged or dissipated to maintain optimum DC voltage on the DC bus for the proper functioning of the microgrid site which is done by the DBM 318. Detailed working and use of the DBM 318 and the energy dissipating circuitry are explained in further parts of the description with reference to FIGS. 5 and 6.

It may be understood that the DC bus 320 is subject to variation in the one or more electrical parameters based at least on the transition between the at least two operating modes and variation in the load operating input associated with the load 306. More specifically, the DC bus voltage on the DC bus 320 tends to fluctuate when the operation of the multi-mode inverter system 304 transitions between the at least two operating modes based at least on faults in the grid 310. In addition, the DC bus voltage tends to fluctuate when there is a fluctuation in the load 306.

Moreover, in some embodiments, the site controller 314 further transmits the control signal to one of the DBM 318 and the energy storage module 316 during a startup of a system based at least on the load operating input and the transitioning of the multi-mode inverter system 304 between the at least two operating modes. The control signal indicates one of activation (turn ON) and deactivation (turn OFF) of one of the DBM 318 and the energy storage module 316 for regulating DC voltage on the DC bus 318.

Further, based on the transition being from the grid-following mode to the grid-forming mode or from the grid-forming mode to the grid-following mode, and the fluctuation of the load 306, one or more scenarios of the operation of the system proposed in the present disclosure may occur. The one or more scenarios are explained with reference to FIGS. 3B-3D. Moreover, it may be noted that the system includes the fuel cell system 302(1), the multi-mode inverter system 304, the site controller 314, the DBM 318, and the energy storage module 316. The fuel cell system 302(1), the multi-mode inverter system 304, and the energy storage module 316 are electrically coupled to the DC bus 320, and electronically coupled to the site controller 314.

The site controller 314 may be communicatively coupled to the plurality of electrical components via a network (not shown in FIG. 3A) such as a wireless or wired communication network. Further, the site controller 314 may transmit the control signal via the network. The network may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among certain entities illustrated in FIG. 3A, or any combination thereof.

It should be noted that the number of the fuel cell systems 302, the power conversion system 304, the energy storage module 316, the DBM 318, the grid isolation device 312, and the load 306 described herein are only used for exemplary purposes and do not limit the scope of the invention. The main objective of the invention is to facilitate the distribution of the power generated by the fuel cell system 302(1) in the microgrid site and the management of the load 306 such that when transitioning from the grid-following mode to the grid-forming mode, step load capability of the fuel cell system 302(1) is improved. Further, the system also provides a better regulated turn OFF of the fuel cell system 302(1) when transitioning from the grid-forming mode to the grid-following mode. This is facilitated by the introduction of the DBM 318 on the DC bus 320 of the microgrid site.

Figure 3B:
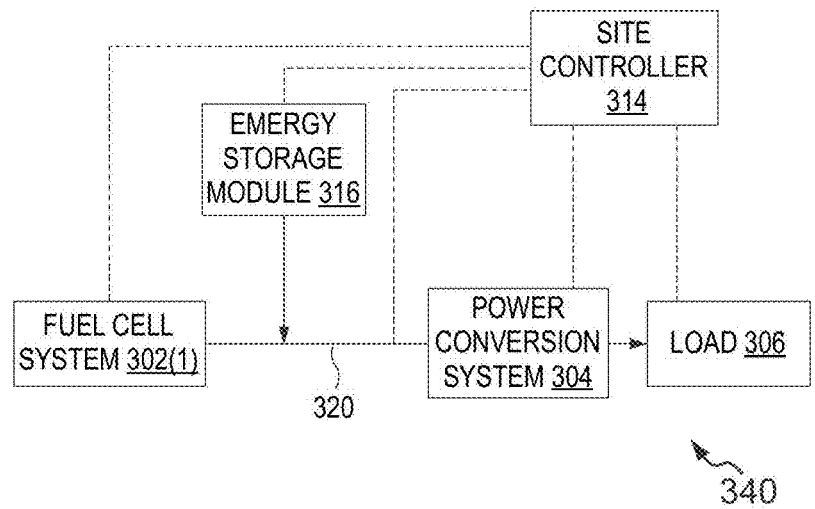
FIG. 3B represents an operating environment of a system proposed in the present disclosure.

FIG. 3B represents an operating environment 340 of the system proposed in the present disclosure. In some embodiments, the load operating input may indicate a condition of the load 306 in which a power supply capacity of the grid 310 is more than the operating requirements of the load 306, whereas a power supply capacity of the fuel cell system (e.g., the fuel cell system 302(1)) is less than the operating requirements of the load 306. Under such conditions, when the load 306 is receiving power from the fuel cell system 302(1) operating in the grid-following mode, since the grid 310 is also available, input power received by the load 306 is sufficient for the load 306 to function appropriately. Also, the supply of power is controlled to meet the requirements of the load 306. However, upon transitioning from the grid-following mode to the grid-forming mode, since the grid 310 became unavailable and the DC bus voltage decreased, the input power received by the load 306 is less than its requirement to function appropriately. The fuel cell system 302(1) experiences a Black start process as the grid 310 becomes unavailable and the microgrid site experiences a blackout because of the same reason. As used herein, the term "Black start" refers to the ability of generators to restart parts of the power system to recover from the blackout. Generally, the black start in the microgrid site is followed by the grid-forming mode. Thus, the load 306 needs to receive that additional power by some means to operate. Under such scenarios, power stored in the energy storage module 316 associated with the fuel cell system 302(1) may be supplied to the load 306. Such an embodiment corresponds to one of the one or more scenarios of the operation of the system proposed in the present disclosure.

Energy storage modules (e.g., the energy storage module 316) in the microgrid site are generally used for storing excess energy or power generated by the fuel cell system 302(1). Moreover, the energy storage module 316 is also capable of supplying stored energy whenever necessary upon receiving instructions from the site controller 314. To that note, the energy storage module 316 is configured to supply power to the DC bus 320 for supporting the at least one load 306, when the DC voltage value on the DC bus 320 is less than the load operating input, based at least on the control signal received from the site controller 314.

Figure 3C:
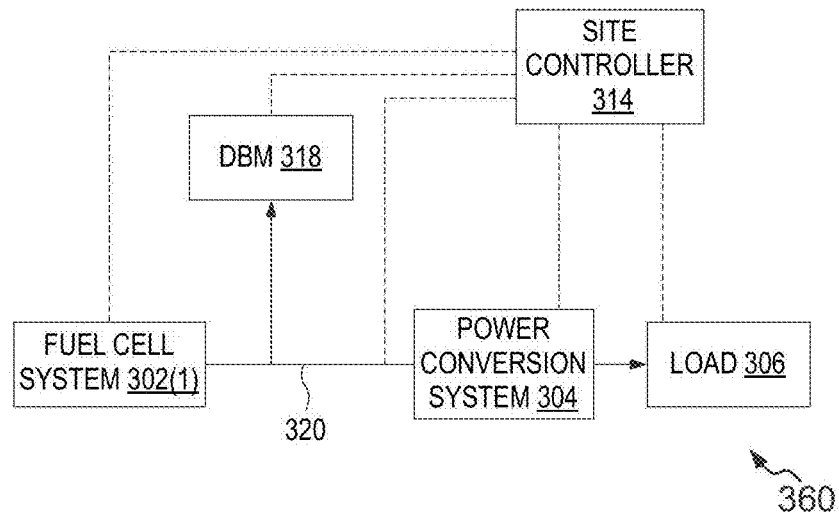
FIG. 3C represents another operating environment indicating another scenario of the operation of a system proposed in the present disclosure.

FIG. 3C represents another operating environment 360 of the system proposed in the present disclosure. In some embodiments, the load operating input may indicate a condition of the load 306 in which a power supply capacity of the fuel cell system (e.g., the fuel cell system 302(1)) is more than operating requirements of the load 306. Under such conditions, when the load 306 is receiving power from the fuel cell system 302(1) operating in the grid-following mode, the supply of the power is controlled to meet the requirements of the load 306 and the input power received by the load 306 is sufficient for the load 306 to function appropriately. However, upon transitioning from the grid-following mode to the grid-forming mode, at an initial stage, over-voltage may appear on the DC bus 320 which is more than the threshold voltage value, until either the power generated by the fuel cell system 302(1) is reduced to meet the load demand or the load is managed to match the power supply capacity of the fuel cell system 302(1). The threshold voltage value may correspond to a maximum operating DC bus voltage value (specified in the drive settings) of the DC bus 320 beyond which a fault of DC bus over voltage may be triggered. Thus, the excess energy on the DC bus 320 may have to be discharged or dissipated to maintain optimum DC voltage on the DC bus 320 for the proper functioning of the microgrid site. Under such scenarios, the DBM 318 dissipates the excess energy on the DC bus 320 until an additional load is applied or power generated by the fuel cell system 302(1) is reduced to match the load demand. Such an embodiment corresponds to another scenario of the one or more scenarios of the operation of the system proposed in the present disclosure.

Figure 3D:
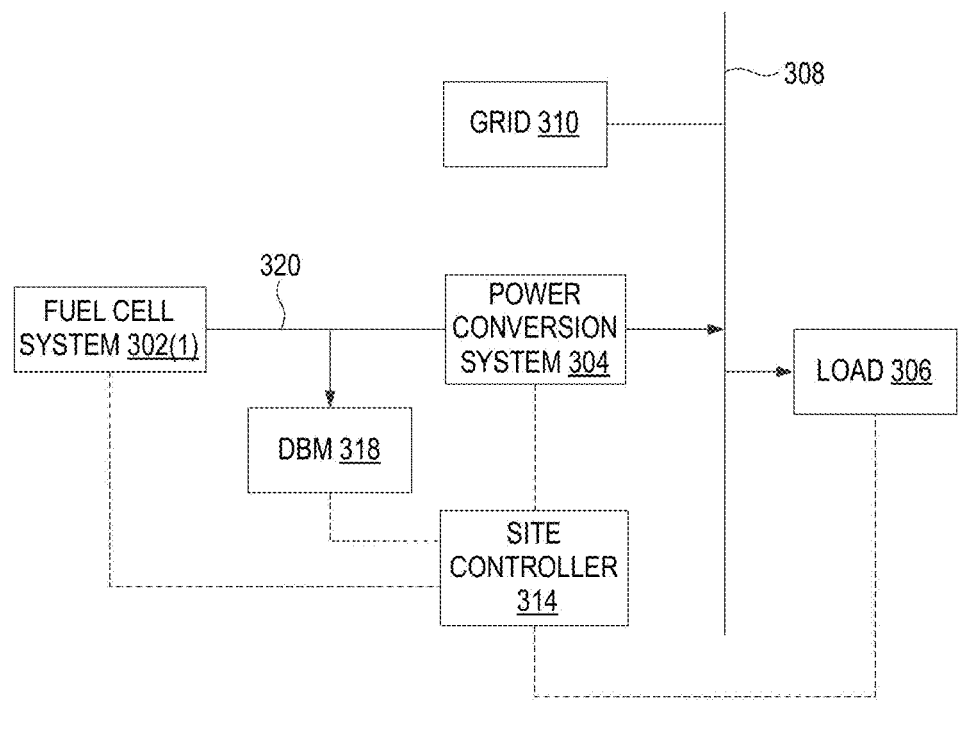
FIG. 3D represents another environment of a system proposed in the present disclosure.

FIG. 3D represents another operating environment 380 of the system proposed in the present disclosure. In some embodiments, the load operating input may indicate a condition of the load 306 in which, when transitioning from the grid-forming mode to the grid-following mode, initially, the load 306 is turned OFF. Under such a scenario, the DC bus voltage on the DC bus 320 increases and may go beyond a threshold voltage value. Thus, the excess energy on the DC bus 320 is dissipated using the DBM 318 which may be electrically coupled to the DC bus 320.

Figure 4A:
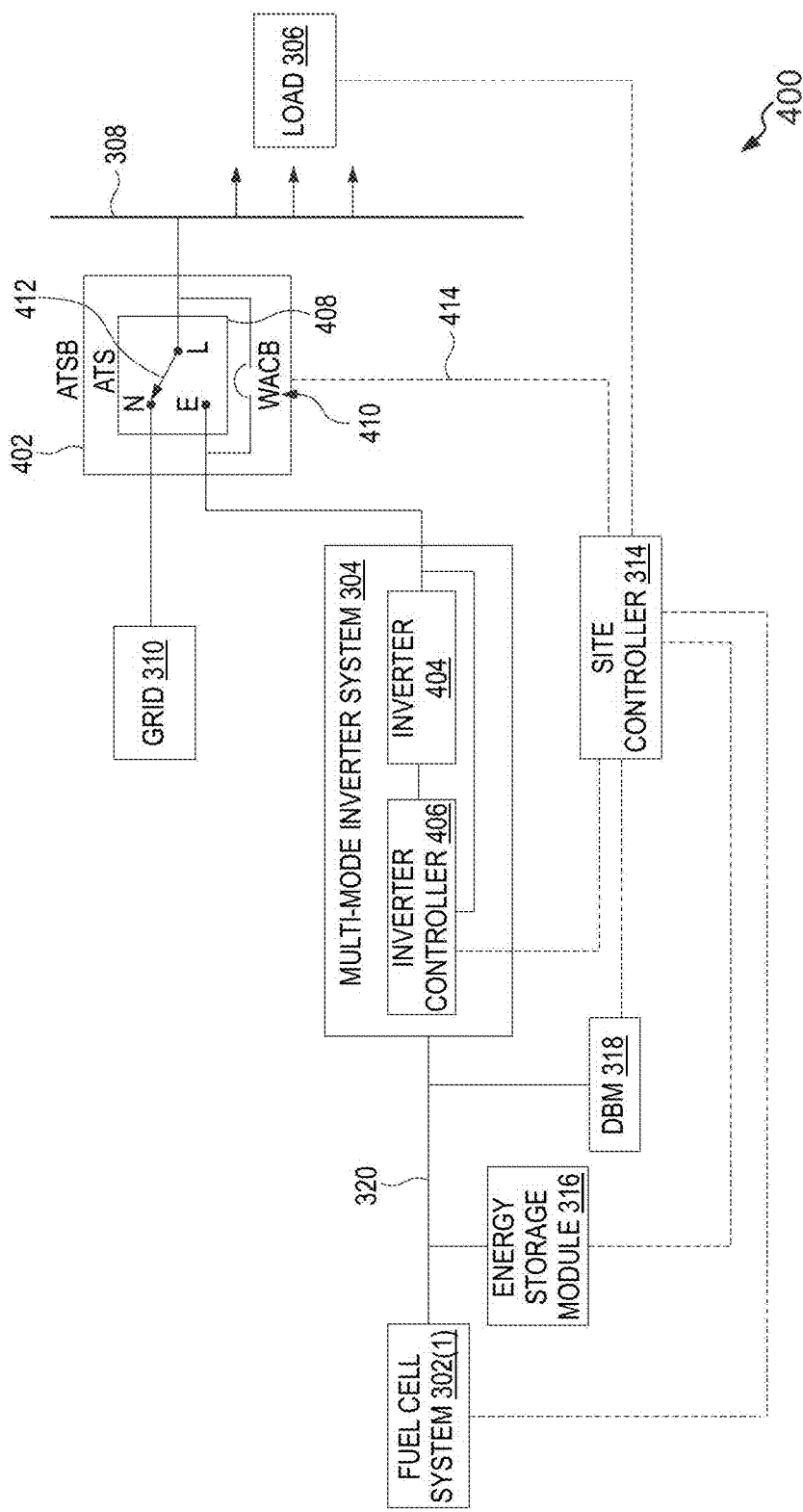
FIG. 4A represents an operating environment related to at least some examples of the present disclosure.

FIG. 4A represents an operating environment 400 related to at least some examples of the present disclosure. The environment 400 as illustrated in FIG. 4A refers to a specific embodiment of the environment 300 disclosed in FIG. 3A. In particular, the environment 400 includes a plurality of electrical components such as the fuel cell system 302(1) electrically connected to the multi-mode inverter system 304 via the DC bus 320, and the ATSB 402 positioned between the grid 310, the load 306 and the multi-mode inverter system 304 for connecting or disconnecting the grid 310 to the load 306 and the multi-mode inverter system 304. The plurality of electrical components further includes an energy storage module 316 and a DBM 318 electrically connected to the DC bus 320. The environment 400 also depicts a site controller 314 electronically coupled to the above-mentioned plurality of electrical components and the plurality of electrical points in the microgrid site.

The multi-mode inverter system 304 may further include an inverter 404 whose output is controlled by an inverter controller 406 based at least on a type and operation of the inverter 404. Thus, the inverter 404 along with the inverter controller 406 within the multi-mode inverter system 304 enables the multi-mode inverter system 304 to convert DC power generated by the fuel cell system 302(1) to AC power, before supplying power to the grid 310 or the load 306.

In the grid-following mode, inverter 404 may be operating as a current source (grid-following inverter) and the inverter controller 406 tracks a voltage angle of the grid 310 to control an output (synchronizing to the grid 310) of the inverter 404. In the grid-forming mode, the inverter 404 may be operating as a voltage source (grid-forming inverter) and the inverter controller 406 actively controls frequency and voltage output of the inverter 404. One important difference is that, in the grid-forming mode, the fuel cell system (e.g., the fuel cell system 302(1)) is constantly working to keep frequency and voltage stable at setpoints with the help of the multi-mode inverter system (e.g., the multi-mode inverter system 304) associated with the fuel cell system 302(1), whereas in the grid-following mode, the fuel cell system (e.g., the fuel cell system 302(1)) only responds to change in the frequency or the voltage when they deviate outside of a certain allowed range for synchronizing them as per grid connection standards with the help of the multi-mode inverter system (e.g., the multi-mode inverter system 304) associated with the fuel cell system 302(1).

Figure 1B:
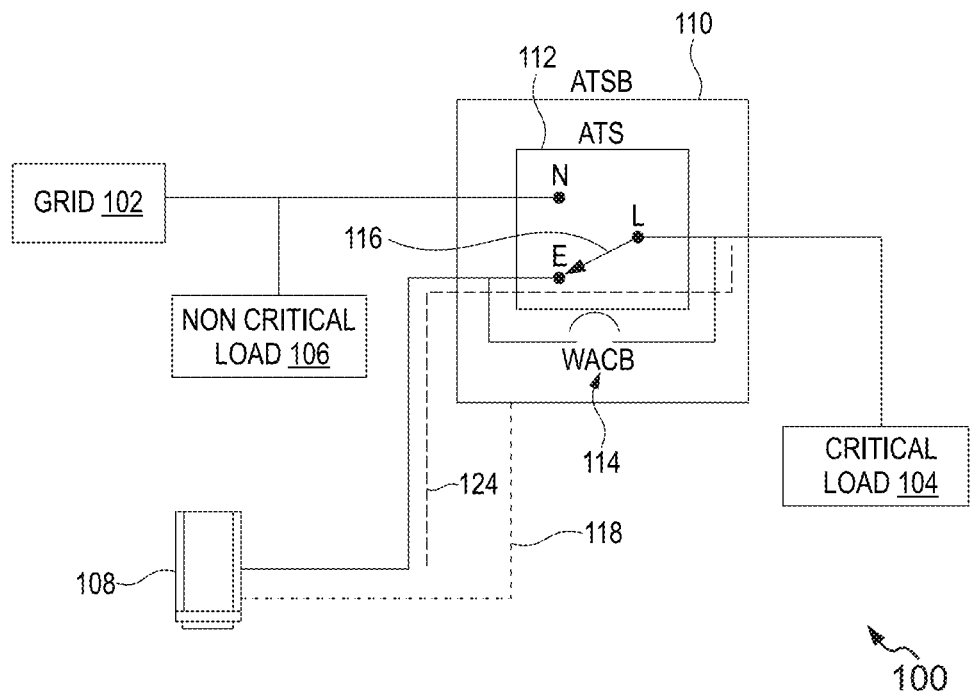
FIG. 1B provides an example of a prior art environment indicating operation and power flow in a microgrid site operating in a grid-forming mode.

In the illustrated example, ATSB 402 is used as a grid isolation device 312 like that depicted in FIG. 3A. However, other types of grid isolation devices may also be used, without limiting the scope of the invention. ATSB 402 is substantially similar to ATSB 110 of FIGS. 1A and 1B. Therefore, ATSB 402 can include an Automatic Transfer Switch (ATS) 408, an electrically operated Wrap Around Circuit Breaker (WACB) 410, and one or more supporting auxiliary circuits (not shown in FIG. 4A).

ATS 408 is a three-position ATS including a position "N" indicating Normal, a position "E" indicating Emergency, and an intermediate position (not shown in FIG. 4A) between "N" and "E". ATS 408 also includes a terminal "L" which is connected to the load 306 via AC bus 314. The terminal "L" is provided with a connector 412 that switches between the three positions based at least on receiving instructions from the site controller 314.

Multiple control signals are exchanged between the ATSB 402 and the site controller 314 for connecting or disconnecting the grid 310 to the load 306. The control signals are referred to as status Input/Output (I/O) signals (see 414), and these signals assist the site controller 314 to determine an operating mode of the multi-mode inverter system 304 being one of the at least two operating modes as mentioned above.

Multiple other control signals and electrical signals may be exchanged between the site controller 314 and the plurality of electrical components and the plurality of electrical points in the microgrid site. In FIG. 4A, these signals are indicated by dotted lines. The variation in these signals and the I/O signals and how DBM 318 and the energy storage module 316 play their roles in managing the distribution of the power from the fuel cell system 302(1) to the load 306 is explained in detail with reference to FIG. 4B.

Figure 4B:
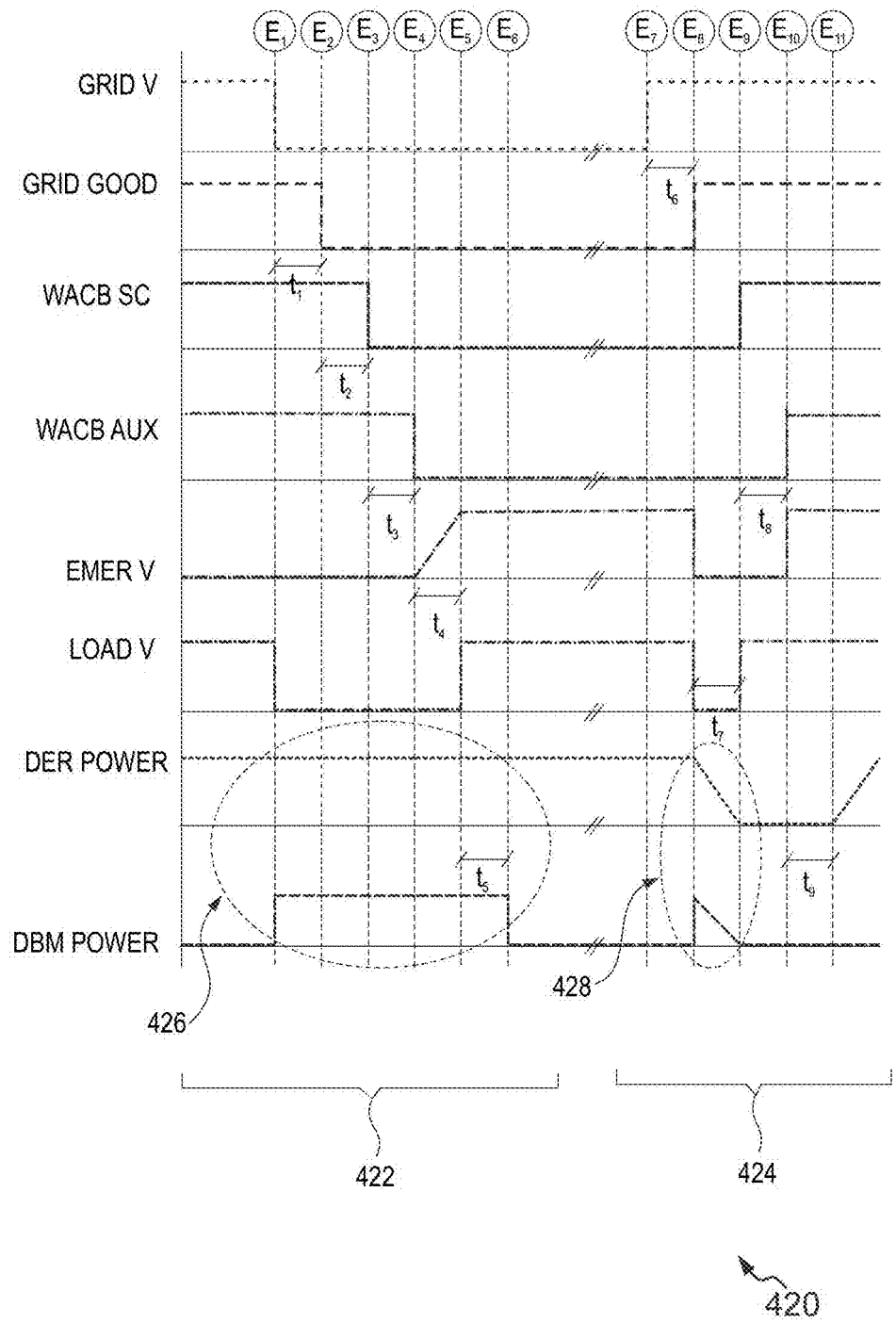
FIG. 4B is a timing diagram showing a sequence of events during the transition between the grid-following mode and the grid-forming mode for the environment of FIG. 4A in accordance with an embodiment of the present disclosure.

FIG. 4B is a timing diagram 420 showing a sequence of events during the transition between the grid-following mode and the grid-forming mode for the environment 400 of FIG. 4A, in accordance with an embodiment of the present disclosure. The I/O signals include WACB Auxiliary (WACB Aux or WACB AUX) signal, a Grid Good (GRID GOOD) signal, and a WACB System Command (WACB SC) signal. The WACB Aux signal indicates a status of the WACB 410 being 'ON' or 'OFF', or 'closed' or 'open'. The Grid Good signal indicates the availability status of the grid 310, i.e., it indicates whether the grid 310 is working or not. The WACB SC signal instructs the WACB 410 to open or close based on the availability status of the grid 310.

Further, the I/O signals collectively indicate transitioning of the operating mode of the multi-mode inverter system 304 from the grid-following mode to the grid-forming mode (see 422) or from the grid-forming mode to the grid-following mode (see 424). Furthermore, the rest of the signals include a grid voltage (Grid V or GRID V) signal, an Emergency voltage (Emer V or EMER V) signal, a fuel cell system power (DER power or DER POWER) signal, a load voltage (Load V or LOAD V), and a DBM power (DBM POWER) signal as shown in FIG. 4B. The Grid V signal indicates a voltage of the grid 310, the Emer V signal indicates a supply of emergency voltage to the grid 310, the DER power signal indicates the DC power from the fuel cell system 302(1), the Load V signal indicates the voltage at the load 306, and the DBM power signal indicates the power that got dissipated in the DBM 318.

When the grid 310 is lost, the operating mode of the multi-mode inverter system 304 changes from the grid-following mode to the grid-forming mode. Thus, the status of all the I/O signals transition from "High" to "Low", at finite time instances from "$t_1$" to "$t_5$" which corresponds to the occurrence of a sequence of events ($E_1$ to $E_6$) as the voltage of the grid 310 falls and the fuel cell system 302(1) transitions from being a current source (in the grid parallel mode) to being a voltage source (in the island volt mode). The total time for transitioning from the grid-following to the grid-forming mode, $t_{GP\_to\_IV}$ is given as "$t_{GP\_to\_IV}=t_1+t_2+t_3+t_4+t_5$".

Figure 2:
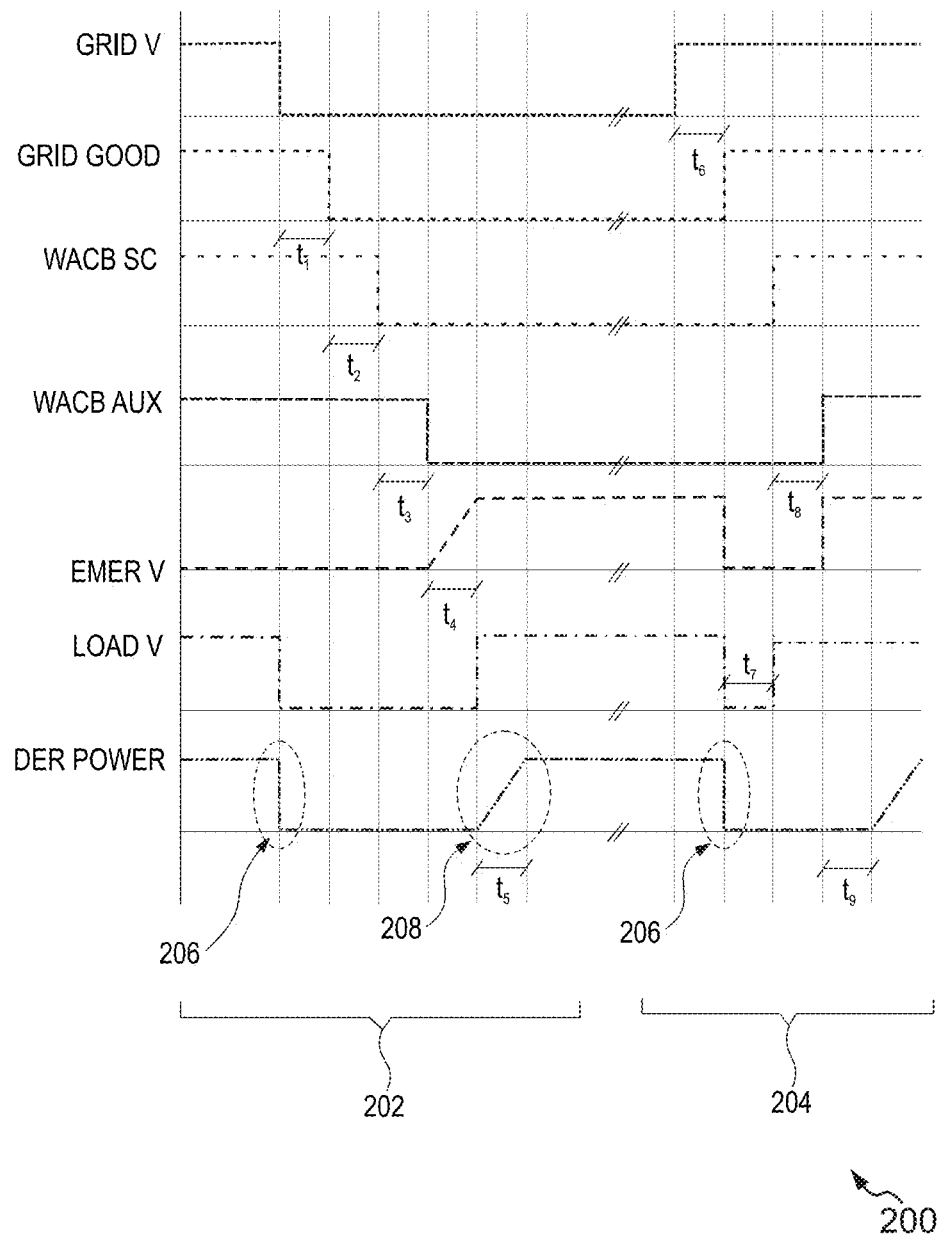
FIG. 2 is a timing diagram showing a sequence of events during a transition between the grid-following mode and the grid-forming mode in the prior art environment of FIGS. 1A and 1B.

The important point to be noted compared to prior art disclosed in FIG. 2 is that in the prior art environment 100, the power of the fuel cell system 302(1) changes over from "Full Load" to "No Load" instantly during the transition from the grid parallel mode to the island volt mode. It is evident from FIG. 4A (see 422) that the DBM 318 provides momentary buffering, for a period, for example, close to about 20 seconds. During this time, the load 306 may be managed and reduced to the level of the power supply capacity of the fuel cell system 302(1). Further, the island volt mode may be transitioned seamlessly without changing an output power of the fuel cell system 302(1). This also provides an additional feature of enabling a complete step load on the fuel cell system 302(1) during the Black start period.

Similarly, the transition from the grid-forming mode to the grid-following mode shall happen once the grid voltage and frequency are within the limits. As soon as the grid voltage returns, the I/O signals shall changeover from "Low" to "High" as shown in FIG. 4B (see 424), at finite time instances from "$t_6$" to "$t_9$" which correspond to the occurrence of a sequence of events ($E_7$ to $E_{11}$) as the voltage of the grid 310 returns and the fuel cell system 302(1) transitions from being a voltage source (in the island volt mode) to being a current source (in the grid parallel mode). The total time for the transitioning from the grid-forming mode to the grid-following mode, $t_{IV\_to\_GP}$ is given as "$t_{IV\_to\_GP}=t_6+t_7+t_8+t_9$". As shown in FIG. 4B (see 424), the use of the DBM 318 allows the system to gracefully "Turn OFF" the fuel cell system 302(1) instead of a sudden shutdown which can cause thermal shock to the fuel cell system 302(1).

The sequence of events ($E_1$ to $E_6$) that occurred during the transition from the grid-following mode to the grid-forming mode as shown in FIG. 4B (see 422) are as follows:

At Event $E_1$: The grid voltage (GRID V) falls below acceptable limits (e.g., E<0.2 per-unit system (pu)), up to which the grid 310 is considered to be healthy. Initially, the grid voltage was 1 pu. Further, as the Load voltage (LOAD V) falls, the effective power output also falls, however, the input power (DER POWER) remains unchanged. Due to the imbalance between input power (DER POWER) and the output power, the DC voltage on the DC bus rises. The DBM 318 starts dissipating the excess energy into the braking resistor and the DBM power (DBM POWER) becomes equal to the fuel cell system power (DER POWER) (see 426).

At Event $E_2$: In response to the grid voltage falling below acceptable limits, the grid good (GRID GOOD) signal goes from 'HIGH' to 'LOW' after a time delay, $t_1$, and this is sent to the site controller 314, thereby informing the site controller 314 that the grid 310 is lost.

At Event $E_3$: Based on the grid good signal received by the site controller 314, the WACB System Command (WACB SC) signal goes from 'HIGH' to 'LOW' after a time delay, $t_2$, and this signal is sent to the WACB 410. Upon receiving this signal, the WACB 410 opens.

At Event $E_4$: The site controller 314 waits to receive a confirmation from the WACB 410, that the WACB 410 has opened by reading the WACB auxiliary (WACB AUX) signal. The WACB auxiliary signal is received after the contacts of the circuit breaker of the WACB 410 have mechanically been separated after a time delay, $t_3$.

At Event $E_5$: Starting from time instance $t_4$ all the way to time instance $t_5$, the output voltage shall be built in the grid-forming mode as shown in FIG. 4B, at a time delay, $t_4$.

At Event $E_6$: Once the loads on site are turned ON at this point in time, the power from the fuel cell system 302(1) shall service the loads due to which the power being dissipated in the DBM (DBM POWER) becomes 0 after a time delay of $t_5$ (see 426).

Thus, it may be noted that, during the transition, that is, from the grid-following mode to the grid-forming mode (see 422), the power from the fuel cell system 302(1) (i.e., the DER POWER) remains in "Full load" (see 426) and hence avoids undesirable instant turning OFF of the fuel cell system 302(1).

Further, the sequence of events ($E_7$ to $E_{11}$) that occur during the transition from the grid-forming mode to the grid-following mode as shown in FIG. 4B (see 424) are as follows:

At Event $E_7$: At this instant in time, the grid voltage (GRID V) recovers, and the system can now transition back to the grid-following mode after the reconnect time.

At Event $E_8$: The Grid good signal is now changed from 'LOW' to 'HIGH' indicating the site controller 314 that the grid 310 is stable and ready to take the load 306 after a time interval, $t_6$. The voltage being generated in the grid-forming mode is made 0 as the system is ready to transfer to the grid parallel mode. Also, as the output voltage of the system is made 0 the instantaneous output power becomes 0 whereas the input power is high. This causes the DC bus 320 to rise and the same is dissipated by the DBM 318. The input fuel to the fuel cell system 302(1) is now gradually reduced to ensure a graceful shutdown (see 428) to prevent thermal shock on the fuel cells.

At Event $E_9$: Based on the grid good signal received by the site controller 314, the WACB System Command (WACB SC) signal goes from 'LOW to'HIGH after a time delay, $t_7$, and this signal is sent to the WACB 410. Upon receiving this signal, the WACB 410 closes for the fuel cell system 302(1) to connect to the grid 310.

At Event $E_{10}$: After a time delay of $t_8$, the WACB auxiliary contact feedback is received from the WACB 410 which indicates that the actual contacts of the circuit breaker of the WACB 410 have closed.

At Event $E_{11}$: The site controller 314 waits for a reconnect time period of about $t_9$ to ensure that the grid 310 is stable before the inverter 404 can start pushing power into the grid 310 within time, $t_9$. After completion of all the time instances, the fuel cell system 302(1) may ramp power back up.

Figure 5:
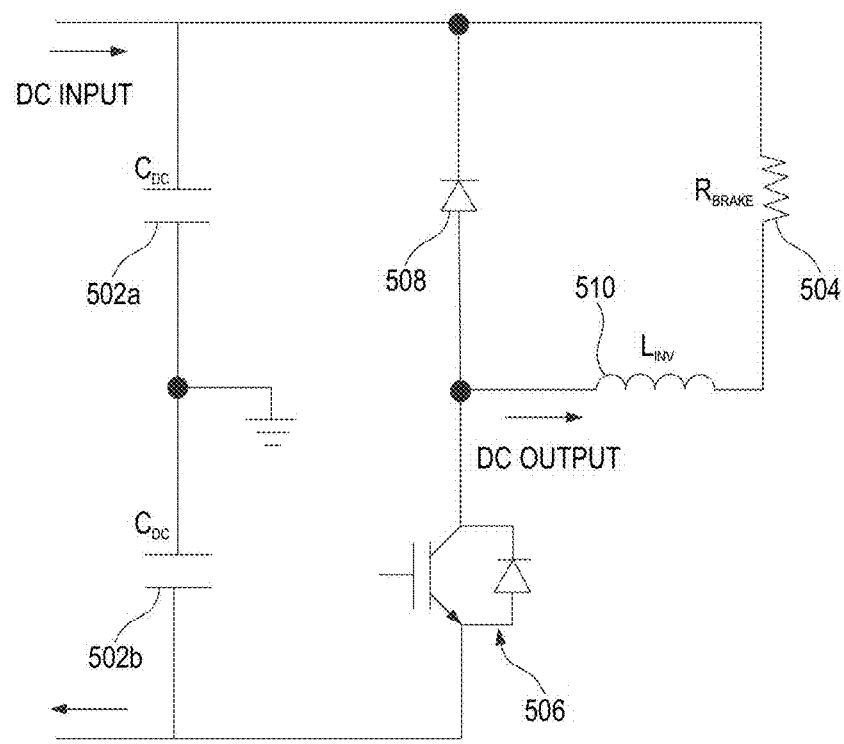
FIG. 5 is a single line diagram representing a circuitry of a Direct Current (DC) braking module positioned on a DC bus in accordance with an embodiment of the present disclosure.

FIG. 5 is a single line diagram representation 500 of a circuitry of the DBM 318 positioned on the DC bus 320, in accordance with an embodiment of the present disclosure. The single line diagram representation 500 indicates connections of an input, an output, and one or more internal components of the DBM 318. The input and output of the DBM 318 are DC as shown in FIG. 5 as 'DC Input' and 'DC output' with a direction of power flow in the DBM 318. Further, the input to the DBM 318 is provided through a fuse and a pre-charged relay/contactor (not shown in FIG. 5) to charge DC bus capacitors (e.g., DC bus capacitors 502a and 502b) (hereinafter, interchangeably referred to as a DC mid-bus capacitor 502a or 502b) in the DBM 318 with their capacitance being indicated by $C_{DC}$ farad (F).

In some embodiments, the DC bus capacitors connected on the DC bus 320 before the inverter 404 of the multi-mode inverter system 304 act as junction capacitors for an input power ($P_{IN}$) (DC input) from a source such as the fuel cell system 302(1) and load power on an AC output ($P_{OUT}$). Voltage on the DC bus capacitors gets affected if $P_{IN}$ and $P_{OUT}$ are not equal in magnitude. During step changes in the load power, power on ACoutput i.e., $P_{OUT}$ may become even negative or very much less than the power from the fuel cell system 302(1) i.e., $P_{IN}$, and results in the DC bus 320 to charge over a threshold limit i.e., the threshold voltage value as mentioned above.

A continuous rise in the DC Bus voltage may cause the fuel cell system 302(1) to trip on DC Bus over voltage which is undesirable. The DBM 318 may absorb this excess energy ($\Delta E$) to bring back the DC bus voltage within the desired limits. For the DBM 318 to be able to absorb this excess energy, the DBM 318 uses a half-bridge chopper circuit including a connection of at least one braking resistor ($R_{BRAKE}$) 504, at least one power transistor 506, and at least one diode 508. As used herein, the term "chopper circuit" refers to a DC-DC converter. In some embodiments, similar to transformers of AC circuits, choppers are used to step up and/or step down the DC power. However, typically, choppers are buck converters and very rarely boost converters. They change the fixed DC power to variable DC power. Using these, DC power supplied to the devices connected at an output end of the chopper circuit can be adjusted to the required amount. Similarly, the term "half-bridge chopper circuit" refers to a chopper circuit that is unable to switch the polarity of the voltage applied to the load.

In an instance, at least one braking resistor 504 may appear at the output of the DBM 318. At least one resistor 504 is designed to dissipate excess energy on the DC Bus 320 by converting it to heat. Further, at least one braking resistor becomes operational when the DC bus 320 temporarily exceeds a pre-set threshold voltage (e.g., the threshold voltage value). Furthermore, at least one braking transistor (e.g., the at least one power transistor 506) shunts the current from the DC bus 320 across the at least one braking resistor 504 when a voltage threshold is exceeded.

In the illustrated example, at least one power transistor 506 is an Insulated-Gate Bipolar Transistor (IGBT). However, any other power transistor may also be used, such as a Silicon Carbide Metal Oxide Semiconductor Field Effect Transistor (SiC MOSFET), without limiting the scope of the invention. Moreover, at least one power transistor 506 may be provided with a freewheeling diode connected in an anti-parallel direction to at least one power transistor 506, to conduct current in an opposite direction.

In an example, a current limiting series inductor 510 is used to reduce the rate of rise of current in the event of any short-circuit conditions. Therefore, the one or more internal components of the DBM 318 include the half-bridge chopper circuit and the current limiting series inductor 510. Further details about the working of the DBM 318 and other components are explained with reference to FIG. 6.

Figure 6:
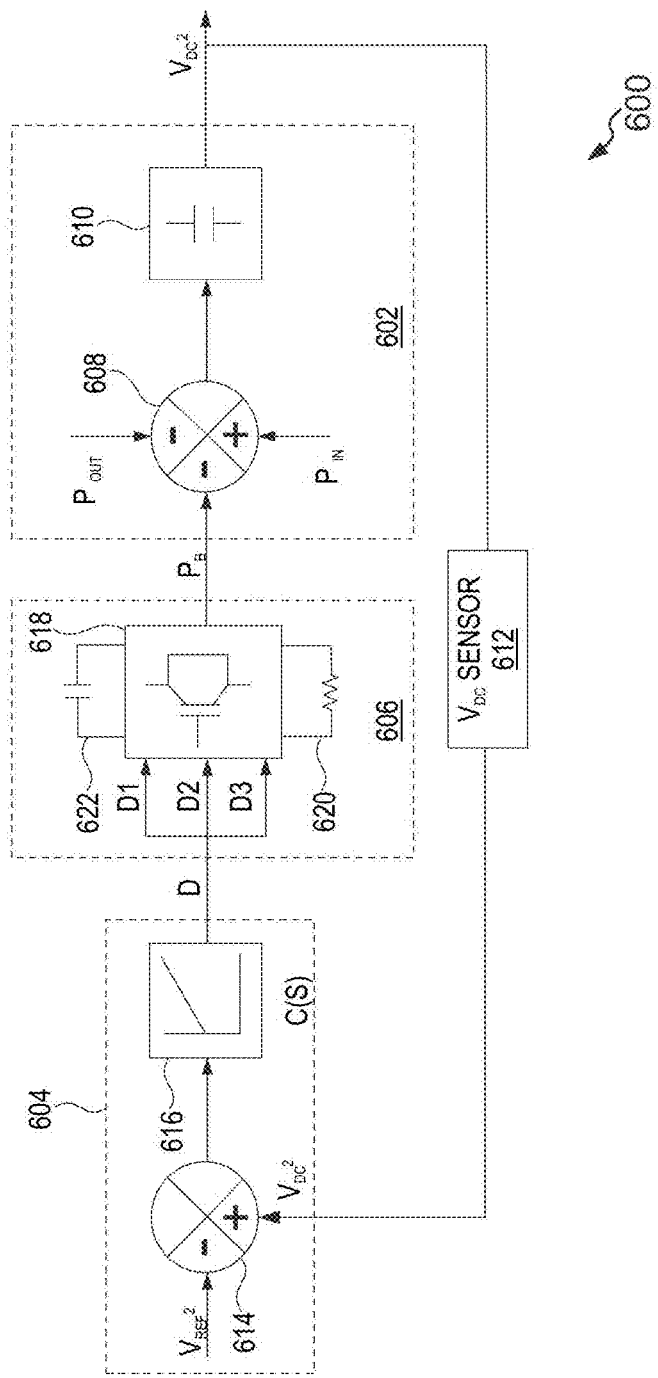
FIG. 6 represents a DC braking module control architecture in accordance with an embodiment of the present disclosure.

FIG. 6 represents a DBM control architecture 600, in accordance with an embodiment of the present disclosure. It is understood that the power conversion system 304 processes the input power incoming from the source such as the fuel cell system 302(1) and feeds the load 306. Ideally, the input power is equal to the load power. However, there could be variations in the load 306 with respect to time, and thus the output power also varies with time.

Further, dynamics in the load 306 may be much faster at times than the dynamics of the source which leads to excessive power on a DC link of the DC bus 320 that connects the source and the power conversion system 304. Excess energy (ΔE) may be determined by using the following equation:

$$\Delta E = \frac{1}{2} C \left( V_{DC}^2 - V_{REF}^2 \right) \quad (1)$$

Here, 'C' refers to a capacitance of the DC mid-bus capacitor, '$V_{DC}$' refers to DC voltage on the DC bus that gets applied to the DC mid-bus capacitor, and '$V_{REF}$' refers to the maximum operating DC bus voltage value. Further, this excess energy ΔE is dissipated by the DBM 318, via the energy dissipating circuitry, as the DBM 318 is provided at the DC link of the DC bus 320. This enables the DC bus 320 to stay far away from rated limits of over-voltage and allows the source and the power conversion system 304 to recover to the new load condition.

Moreover, with the input power $P_{IN}$ and the output power being $P_{OUT}$, the DC bus power $P_B$ may be indicated by the following equation:

$$P_B = P_{OUT} - P_{IN} \quad (2)$$

$$\Delta P_B = -\Delta P_{OUT} \quad (3)$$

Here, '$\Delta P_B$' refers to a change in the DC bus power, and '$\Delta P_{OUT}$' refers to a change in the output power. In some embodiments, the DBM control architecture 600 may correspond to a block diagram representation of a control system of the DBM 318. Further, the architecture 600 indicates that the DBM 318 includes a DC mid-bus capacitor sub-module 602, a DBM controller sub-module 604, and a DC chopper sub-module 606. The DC mid-bus capacitor sub-module 602 may include a summing point 608 followed by a DC mid-bus capacitor 610. In the illustrated example, the summing point 608 performs the operation stated in the equation (2), and gives its output power to the DC mid-bus capacitor 610. The DC mid-bus capacitor 610 charges and hence stores certain energy i.e., 'E' which is determined by the following equation:

$$E = \frac{1}{2} C V_{DC}^2 \quad (4)$$

Since the energy 'E' in the DC mid-bus capacitor 610 is proportional to the square of the DC voltage ($V_{DC}$) in the DC bus, a power flow control of the architecture 600 is designed to control the square of the DC voltage on the DC bus as shown in FIG. 6. This way of control ensures the control of the energy 'E' on the DC bus. Further, a voltage sensor such as a $V_{DC}$ sensor 612 as shown in FIG. 6, senses the square of the DC voltage ($V_{DC}$) on the DC bus, and the same is fed back to the DBM controller sub-module 604. Generally, a controller is basically a unit present in a control system that generates control signals to reduce the deviation of the actual value from the desired value to almost zero or the lowest possible value. It is responsible for the control action of the system so as to get the accurate output.

In some embodiments, the DBM controller sub-module 604 may be one of a proportional controller, a derivative controller, an integral controller, a Proportional-Integral (PI) controller, a Proportional-Derivative (PD) controller, a Proportional-Integral-Derivative (PID) controller, or the like. Therefore, based on the type of the DBM controller sub-module 604, a corresponding transfer function may be applied to an error signal obtained upon a comparison of the feedback signal with a reference signal by a control system corresponding to the DBM controller sub-module 604. Therefore, the DBM controller sub-module 604 includes a summing point 614 which determines a difference between the feedback signal i.e., $V_{DC}^2$, and a reference signal (the maximum operating DC bus voltage value) i.e., $V_{REF}^2$. The output (error signal) of the summing point 614 is then applied to a transfer function C(s) block 616, which essentially provides a multiplying factor to the error signal obtained from the summing point 614. For instance, the transfer function block 616 may be implemented in accordance with equation (1).

Therefore, an output of the DBM controller sub-module 604 may be the excess energy ΔE, which is used as a duty cycle for control of the dissipation of energy via the DC chopper sub-module 606. For instance, the DC chopper sub-module 606 may be a 3-leg DC chopper as shown in FIG. 6. The duty cycle 'D' of the output of the DBM controller sub-module 604 may be split into three duty cycles such as D1, D2, and D3, each cycle being fed to each leg of the 3-leg DC chopper. Each leg of the 3-leg DC chopper may correspond to a braking resistor. Further, the excess energy ΔE is dissipated through each braking resistor and the power transistor 618.

The DBM controller sub-module 604 may also measure other parameters such as pole current, Thermal Cut-Out (TCO), and other signals for protection of power modules such as the fuel cell systems 302. Further, the DBM controller sub-module 604 may also calculate the instantaneous energy of the system and ensure that the DBM 318 is turned OFF once the maximum energy rating of the braking resistor is hit.

The DBM controller sub-module 604 communicates with the site controller 314 to convey the status of the system and receive ON/OFF commands from the site controller 314. The DBM controller sub-module 604 communicates with the site controller 314 using a Controller Area Network (CAN) communication interface.

A resistor 620 shown in FIG. 6 corresponds to a resistor having an effective resistance of the three braking resistors connected in parallel with each other via which the excess energy ΔE is dissipated. For instance, the value of resistance corresponding to each braking resistor to each phase is equal in magnitude. Thus, in such a scenario, a duty cycle magnitude to all the three legs is also the same in magnitude.

Further, the excess energy ΔE that is dissipated through the braking resistors may charge a capacitor 622, and the power at the output of the 3-leg DC chopper may correspond to DC bus power ($P_B$) which got generated as excess power in the DC bus 320 due to difference in the input power and the load power on the AC output. Thus, it may be understood that the energy dissipating circuitry includes the DC chopper sub-module 606.

Figure 7:
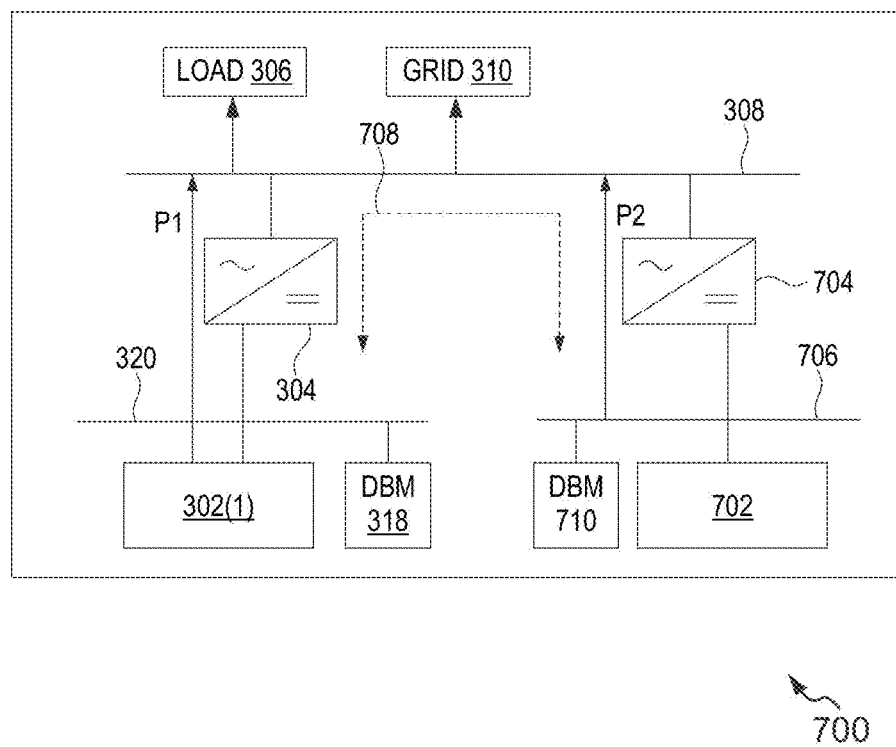
FIG. 7 represents an environment illustrating different types of Distributed Energy Resources (DERs) powering a common load in accordance with an embodiment of the present disclosure.

FIG. 7 represents an environment 700 illustrating different types of Distributed Energy Resources (DERs) powering a common load (e.g., the load 306), in accordance with an embodiment of the present disclosure. In some embodiments, a microgrid site may include different types of DERs powering the AC bus 308 to which the load 306 and the grid 310 may be connected as a point of common connection. For instance, a DER 702, which may be a solar photovoltaic system, may be connected to the AC bus 308 via a multi-mode inverter system 704 designed specially to receive and process DC power from the solar photovoltaic system. The multi-mode inverter system 704 and the DER 702 are electrically connected with each other via a DC bus 706.

DER 702 may also be a fuel cell system but manufactured by a different manufacturer and hence may have different features and different operating parameters and conditions. Therefore, power P1 may be transmitted from the fuel cell system 302(1) to the AC bus 308, and power P2 may be transmitted from the DER 702 to the AC bus 308. In such scenarios, i.e., when different types of DERs are connected to a common AC bus for supplying power to a common load, there could be conditions of reverse power flow (see 708). This reverse power flow is typically high in magnitude but low in duration. These scenarios can cause DC bus Overvoltage (OV) conditions and trip many systems such as the fuel cell system 302(1), the power conversion system 304, etc. The DBMs 318 and 710 are quick energy absorbers of high power rating which will enable these micro-grids to operate under these short-term scenarios.

Figure 8:
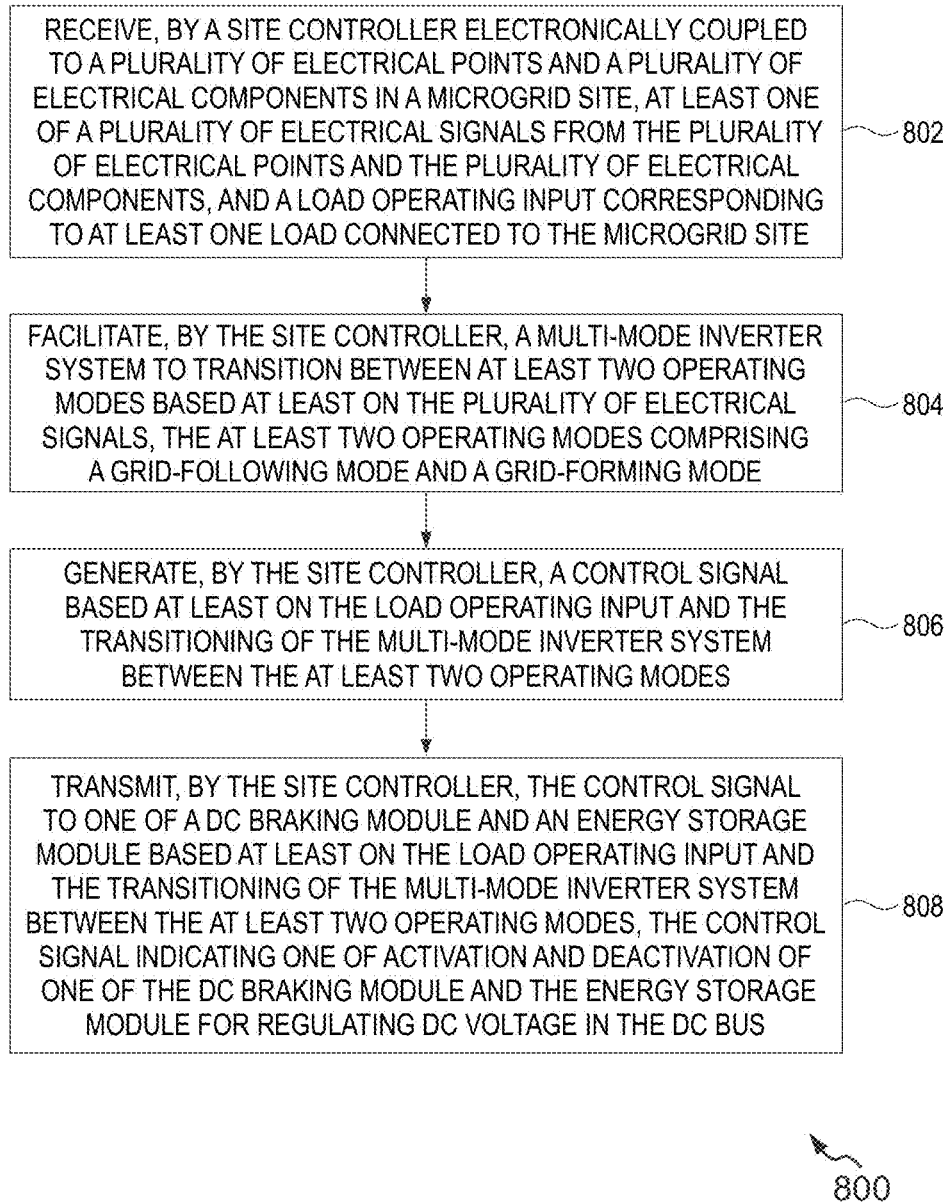
FIG. 8 is a flowchart illustrating a method for microgrid-power distribution management when transitioning between operating modes of the DERs in accordance with an embodiment of the present disclosure.

FIG. 8 is a flowchart illustrating a method 800 for microgrid-power distribution management when transitioning between operating modes of the DERs, in accordance with an embodiment of the present disclosure. The method 800 depicted in the flow diagram may be executed by, for example, the site controller 314. Operations of the flow diagram of the method 800, and combinations of operations in the flow diagram of the method 800, may be implemented by, for example, hardware, firmware, processors, circuitry, and/or different devices associated with the execution of software that includes one or more computer program instructions. The method 800 starts at operation 802.

At 802, the method 800 includes receiving, by the site controller 314 electronically coupled to a plurality of electrical points and a plurality of electrical components in a microgrid site, at least one of a plurality of electrical signals from the plurality of electrical points and the plurality of electrical components, and a load operating input corresponding to at least one load (e.g., the load 306) connected to the microgrid site.

In an embodiment, the load operating input includes a range of values corresponding to operating parameters associated with the at least one load 306.

At 804, the method 800 includes facilitating, by the site controller 314, a multi-mode inverter system 304 to transition between at least two operating modes based at least on the plurality of electrical signals, the at least two operating modes including a grid-following mode and a grid-forming mode.

At 806, the method 800 includes generating, by the site controller 314, a control signal based at least on the transitioning of the multi-mode inverter system 304 between the at least two operating modes and the load operating input.

At 808, the method 800 includes transmitting, by the site controller 314, the control signal to one of a DC braking module 318 and an energy storage module 316 based at least on the load operating input and the transitioning of the multi-mode inverter system 304 between the at least two operating modes, the control signal indicating one of activation (turn ON) and deactivation (turn OFF) of one of the DC braking module 318 and the energy storage module 316 for regulating DC voltage on a DC bus 320.

In an embodiment, when transitioning from the grid-following mode to the grid-forming mode and the load operating input corresponding to an indication that the load 306 requires power more than a power supply capacity of the fuel cell system 302(1), the DC voltage value on the DC bus 320 decreases, thereby causing the energy storage module 316 to support the at least one load 306.

Further, when transitioning from the grid-following mode to the grid-forming mode and the load operating input corresponding to an indication that the load 306 requires power less than a power supply capacity of the fuel cell system 302(1), the DC voltage value on the DC bus 320 increases, thereby causing the DC braking module 318 for dissipating the excess energy.

Furthermore, when transitioning from the grid-forming mode to the grid-following mode, initially the DC voltage value on the DC bus 320 increases, causing the DC braking module 318 to dissipate the excess energy.

Moreover, the method 800 may include receiving, by the DC braking module 318 electrically coupled on the DC bus 320, a DC voltage value from the DC bus 320. Herein, the DC braking module 318 may be turned ON in response to the receipt of the control signal from site controller 314. In an embodiment, receiving, by the DC braking module 318, the DC voltage value from the DC bus 320 includes receiving the DC voltage value via a DC mid-bus capacitor 502a or 502b.

The method 800 may also include dissipating, by the DC braking module 318, the excess energy, via energy dissipating circuitry, from the DC bus 320 when the DC voltage value is greater than a threshold voltage value, based at least on the control signal received from the site controller 314. In an embodiment, dissipating the excess energy, via the energy dissipating circuitry includes dissipating the excess energy, via the energy dissipating circuitry, wherein the energy dissipating circuitry includes a DC chopper sub-module 606.

Further, the method 800 includes supplying, by the energy storage module 316, power to the DC bus 320 for supporting the at least one load 306, when the DC voltage value on the DC bus 320 is less than the load operating input.

The method 800 further includes determining, by the site controller 314, the availability status of the grid 310 based at least on the plurality of electrical signals.

The disclosed method 800 with reference to FIG. 8, or one or more operations of the method 800 may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system, comprising:
a fuel cell system configured to generate Direct Current (DC) power in a microgrid site;
a multi-mode inverter system electrically connected to the fuel cell system via a DC bus, the multi-mode inverter system configured to operate in one of at least two operating modes based at least on an availability status of a grid electrically coupled to the microgrid site, for supplying power to at least one load, the at least two operating modes comprising a grid-following mode and a grid-forming mode;
a site controller electronically coupled to a plurality of electrical points and a plurality of electrical components in the microgrid site, the site controller configured to:
receive at least one of a plurality of electrical signals from the plurality of electrical points and the plurality of electrical components, and a load operating input corresponding to the at least one load connected to the microgrid site;
facilitate the multi-mode inverter system to transition between the at least two operating modes based at least on the plurality of electrical signals; and
generate a control signal based at least on the load operating input and the transitioning of the multi-mode inverter system between the at least two operating modes;
a DC braking module electrically connected to the DC bus, the DC braking module configured to:
turn ON in response to the receipt of the control signal;
receive a DC voltage value from the DC bus; and
dissipate excess energy, via energy dissipating circuitry, from the DC bus when the DC voltage value is greater than a threshold voltage value and during transitioning of the multi-mode inverter system between the at least two operating modes; and
an energy storage module electrically connected to the DC bus, the energy storage module configured to:
turn ON in response to the receipt of the control signal; and
supply power to the DC bus for supporting the at least one load, when the DC voltage value on the DC bus is less than the load operating input and during transitioning of the multi-mode inverter system between the at least two operating modes.

2. The system as claimed in claim 1, wherein the site controller is further configured to transmit the control signal to one of the DC braking module and the energy storage module during a startup of the system based at least on the load operating input and the transitioning of the multi-mode inverter system between the at least two operating modes, the control signal indicating one of activation (turn ON) and deactivation (turn OFF) of one of the DC braking module and the energy storage module for regulating DC voltage on the DC bus.

3. The system as claimed in claim 1, wherein the site controller is further configured to determine the availability status of the grid based at least on the plurality of electrical signals.

4. The system as claimed in claim 1, wherein when transitioning from the grid-following mode to the grid-forming mode and the load operating input corresponding to an indication that the at least one load requires power more than a power supply capacity of the fuel cell system, the energy storage module is configured to supply power to the DC bus to support the at least one load.

5. The system as claimed in claim 1, wherein when transitioning from the grid-following mode to the grid-forming mode and the load operating input corresponding to an indication that the at least one load requires power less than a power supply capacity of the fuel cell system, the DC braking module is configured to dissipate the excess energy, via the energy dissipating circuitry, from the DC bus.

6. The system as claimed in claim 1, wherein when transitioning from the grid-forming mode to the grid-following mode, the DC braking module is configured to dissipate the excess energy, via the energy dissipating circuitry, from the DC bus.

7. The system as claimed in claim 1, wherein the load operating input comprises a range of values corresponding to operating parameters associated with the at least one load.

8. The system as claimed in claim 1, wherein the DC braking module is configured to receive the DC voltage value from the DC bus via a DC mid-bus capacitor.

9. The system as claimed in claim 1, wherein the DC braking module comprises: a DC mid-bus capacitor sub-module, a DC braking module (DBM) controller sub-module, and a DC chopper sub-module electrically connected with each other.

10. The system as claimed in claim 9, wherein the DC chopper sub-module comprises a 3-leg DC chopper.

11. A method, comprising:
providing a fuel cell system to generate Direct Current (DC) power in a microgrid site,
providing a multi-mode inverter system electrically connected to the fuel cell system via a DC bus, the multi-mode inverter system configured to operate in one of at least two operating modes based at least on an availability status of a grid electrically coupled to the microgrid site, for supplying power to at least one load;
providing a DC braking module electrically connected to the DC bus;
providing an energy storage module electrically connected to the DC bus;
receiving, by a site controller electronically coupled to a plurality of electrical points and a plurality of electrical components in the microgrid site, at least one of a plurality of electrical signals from the plurality of electrical points and the plurality of electrical components, and a load operating input corresponding to the at least one load connected to the microgrid site;
facilitating, by the site controller, the multi-mode inverter system to transition between the at least two operating modes based at least on the plurality of electrical signals, the at least two operating modes comprising a grid-following mode and a grid-forming mode;
generating, by the site controller, a control signal based at least on the load operating input and the transitioning of the multi-mode inverter system between the at least two operating modes;
transmitting, by the site controller, the control signal to at least one of the DC braking module and the energy storage module based at least on the load operating input and the transitioning of the multi-mode inverter system between the at least two operating modes;
receiving, by the DC braking module, a DC voltage value from the DC bus, wherein the DC braking module is turned ON in response to receipt of the control signal, and dissipating, by the DC braking module via energy dissipating circuitry, excess energy from the DC bus when the DC voltage value is greater than a threshold voltage value and during transitioning of the multi-mode inverter system between the at least two operating modes; and
supplying, by the energy storage module, power to the DC bus for supporting the at least one load when the DC voltage value in the DC bus is less than the load operating input and during transitioning of the multi-mode inverter system between the at least two operating modes.

12. The method as claimed in claim 11, wherein when transitioning from the grid-following mode to the grid-forming mode and the load operating input corresponding to an indication that the at least one load requires power more than a power supply capacity of the fuel cell system, the control signal indicates the activation of the energy storage module for regulating the DC voltage on the DC bus.

13. The method as claimed in claim 11, wherein when transitioning from the grid-following mode to the grid-forming mode and the load operating input corresponding to an indication that the at least one load requires power less than a power supply capacity of the fuel cell system, the control signal indicates the activation of the DC braking module for regulating the DC voltage on the DC bus.

14. The method as claimed in claim 11, wherein when transitioning from the grid-forming mode to the grid-following mode, the control signal indicates the activation of the DC braking module for regulating the DC voltage on the DC bus.

15. The method as claimed in claim 11, wherein receiving, by the DC braking module, the DC voltage value from the DC bus comprises receiving the DC voltage value via a DC mid-bus capacitor.

16. The method as claimed in claim 11, wherein dissipating the excess energy, via the energy dissipating circuitry comprises dissipating the excess energy, via the energy dissipating circuitry, wherein the energy dissipating circuitry comprises a DC chopper sub-module.

17. The method as claimed in claim 11, further comprising: determining, by the site controller, the availability status of the grid based at least on the plurality of electrical signals.

18. The method as claimed in claim 11, wherein the load operating input comprises a range of values corresponding to operating parameters associated with the at least one load.

* * * * *